United States Patent
Ress et al.

(10) Patent No.: US 6,885,658 B1
(45) Date of Patent: Apr. 26, 2005

(54) METHOD AND APPARATUS FOR INTERWORKING BETWEEN INTERNET PROTOCOL (IP) TELEPHONY PROTOCOLS

(75) Inventors: David P. Ress, Cary, NC (US); Xuewen Li, Cary, NC (US); Denise J. Ingram, Morrisville, NC (US); Gregory Robert Utas, Irving, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/506,945

(22) Filed: Feb. 18, 2000

Related U.S. Application Data

(60) Provisional application No. 60/137,867, filed on Jun. 7, 1999.

(51) Int. Cl.[7] .............................. H04L 12/66; H04J 3/22
(52) U.S. Cl. ........................ 370/352; 370/401; 370/466
(58) Field of Search ................................ 370/352–356, 370/401, 466, 351, 357, 467

(56) References Cited

U.S. PATENT DOCUMENTS

| | | | | | |
|---|---|---|---|---|---|
| 5,915,008 | A | * | 6/1999 | Dulman ................. | 379/221.08 |
| 6,201,805 | B1 | * | 3/2001 | Strathmeyer ................ | 370/356 |
| 6,275,574 | B1 | * | 8/2001 | Oran ...................... | 379/201.01 |
| 6,339,594 | B1 | * | 1/2002 | Civanlar et al. ............ | 370/352 |
| 6,490,275 | B1 | * | 12/2002 | Sengodan .................... | 370/356 |
| 6,584,093 | B1 | * | 6/2003 | Salama et al. .............. | 370/351 |

OTHER PUBLICATIONS

Huitema, Christian et al., "An Architecture for Residential Internet Telephony Service," IEEE Network, May/Jun. 1999, pp. 50–56, XP–000870631.

Hamdi, Maher et al., "Voice Service Interworking for PSTN and IP Networks," IEEE Communications Magazine, May, 1999, pp. 104–111, XP–000830888.

Anquetil, L–P. et al., "Media Gateway Control Protocol and Voice Over IP Gateways," Electrical Communication, Alcatel, Brussels, Belgium, Apr. 1, 1999, pp. 151–157.

International Search Report for corresponding PCT application No. PCT/IB00/00854, mailed Mar. 6, 2001.

Handley et al., "SIP: Session Initiation Protocol," Network Working Group, Request for Comments: 2543, p. 1–111, (Mar., 1999).

Arango et al., "Media Gateway Control Protocol (MGCP)," Internet Engineering Task Force, Internet Draft <draft–huitema–megaco–mgcp–v0r1–05.txt>, p. 1–119, (Feb. 21, 1999).

Huitema et al., "Media Gateway Control Protocol (MGCP) Call Flows," Internet Engineering Task Force, Internet Draft <draft–huitema–megaco–flows–01.txt>, p. 1–125, (Jan. 20, 1999).

International Telecommunication Union, "ITU Recommendation H.323," International Telecommunication Union, Telecommunication Standardization Sector, (Oct., 1997).

* cited by examiner

Primary Examiner—Chau T. Nguyen
Assistant Examiner—Soon D Hyun
(74) Attorney, Agent, or Firm—Withrow & Terranova, PLLC

(57) ABSTRACT

A method and an apparatus for interworking between internet protocol (IP) telephony protocols includes a call server. The call server includes a first protocol agent for communicating with a first protocol device according to a first protocol. A second protocol agent communicates with a second protocol device according to a second protocol. An interworking agent provides functions usable by the first and second protocol agents to communicate with each other according to a third protocol. The third protocol is a superset of functions provided by the first and second protocols.

34 Claims, 20 Drawing Sheets

Connection Information Parameter

| Field | Example Values |
|---|---|
| Media Type | Audio, Video, Data |
| Channel ID | 12345 |
| Channel Operation | No action, open, close, modify, mode change, redirect, direct, send capabilities |
| Current Media Description | G.711@2 frames/packet |
| Media Capabilities | G.711, G.729, RTP address, payload size, media specific information |

*FIG. 8*

METHOD AND APPARATUS FOR INTERWORKING BETWEEN INTERNET PROTOCOL (IP) TELEPHONY PROTOCOLS

PRIORITY APPLICATION

This Application claims the benefit of U.S. Provisional Patent Application Ser. No. 60/137,867 filed Jun. 7, 1999, the disclosure of which is incorporated herein by reference in its entirety.

TECHNICAL FIELD

The present invention relates to a method and an apparatus for interworking between communications protocols. More particularly, the present invention relates to a method and an apparatus for interworking between internet protocol (IP) telephony protocols.

BACKGROUND ART

There are a variety of known protocols for establishing media stream communications, such as voice, data, video, or combinations thereof, over an IP network. Protocols for establishing media stream communications over an IP network are referred to herein as IP telephony protocols. One example of an IP telephony protocol is the media gateway control protocol (MGCP). MGCP defines signals and events by which a software entity, known as a media gateway (MG), is controlled by another software entity, known as a media gateway controller (MGC), in a packet network. The media gateway controller processes call control signaling from one or more signaling gateways (SGs) and utilizes MGCP media control signaling to establish media streams between MGs. An MGC that processes call control signaling in this manner is also referred to as a call agent. The terms media gateway controller and call agent are used interchangeably herein. The media gateway controller performs call control functions, such as translations, resource management, media capabilities negotiation and selection, and media stream management. It can also provide additional services.

FIG. 1 illustrates conventional communications using MGCP. In FIG. 1, MGC 100 receives call signaling information from SGs 102 and 103 and controls MGs 104 and 105 to establish packetized media stream communications between end users in packet network 106. For example, SG 102 and MG 104 can be associated with a calling party end user device for a given media stream communication. Similarly, SG 103 and MG 105 can be associated with a called party end user device for a given media stream communication. MGC 100 can control MGs 104 and 105 to establish media stream communications between the called and calling end user devices, such as PSTN terminals.

A detailed explanation of MGCP is found in Media Gateway Control Protocol (MGCP), Version 0.1 Draft, Internet Engineering Task Force, Feb. 21, 1999, the disclosure of which is incorporated herein by reference in its entirety.

Another example of an IP telephony protocol is International Telecommunications Union (ITU) Recommendation H.323. H.323 defines a protocol by which endpoints, such as gateways, terminals, or multipoint control units MCUs), can place calls in a packet network. A gateway translates between circuit-switched and packet-switched communication protocols. A terminal is a device, such as an IP terminal, that provides end user access to a network. An MCU is a device that supports conferences between three or more endpoints. H.323 defines a gatekeeper as an entity that provides address translation and controls access to the packet network for H.323 endpoints. The gatekeeper can also provide additional services, such as call control and supplementary services.

FIG. 2 illustrates an example of conventional H.323 communications. In FIG. 2, a first gateway 200 can be associated with a calling end user device and a second gateway 202 can be associated with a called end user device for a given media communication. Gatekeeper 204 performs call signaling functions, such as call setup and teardown, to establish calls between end user devices associated with gateways 200 and 202. The end user devices can be PTSN terminals connected to gateway 200. Alternatively, gateway 200 can be omitted and replaced by H.323 terminals or H.323 MCUs. Once gatekeeper 204 performs the call signaling functions necessary to set up a call, the media stream for the call flows between gateways 200 and 202. Detailed information relating to H.323 can be found in ITU Recommendation H.323, Packet Based Multimedia Communications Systems, February 1998, the disclosure of which is incorporated herein by reference in its entirety.

Yet another IP telephony protocol is ITU Recommendation H.248. The Internet Engineering Task Force (IETF) formed the MEGACO Group to evolve the MGCP protocol. As the MEGACO Group matured the protocol, the MEGACO Group allied itself with the ITU, and the specification developed by the MEGACO Group has become known as ITU Recommendation H.248. Thus, ITU recommendation H.248 can be viewed similarly to MGCP.

Another IP telephony protocol is the session initiation protocol (SIP). SIP is an application layer signaling protocol for creating, modifying, and terminating sessions between one or more participants. The sessions include internet multimedia conferences, internet telephone calls, and multimedia distribution. SIP originated from Columbia University and is gaining acceptance as a protocol for exchanging call signaling information over a packet network. A detailed description of SIP can be found in Request for Comments (RFC) 2543 SIP: Session Initiation Protocol, March 1999, the disclosure of which is incorporated herein by reference in its entirety.

In addition to the published protocols described above, many vendors of telecommunications equipment and services are supporting IP telephony applications via proprietary protocols.

All of the IP telephony protocols described above are being implemented by various vendors. However, standards for interworking equipment that communicates using one protocol with equipment that communicates using another protocol are immature, nonexistent, or focus only on a specific type of application. Accordingly, there exists a long-felt need for a novel method and apparatus for interworking between IP telephony protocols.

DISCLOSURE OF THE INVENTION

The present invention provides a novel method and apparatus for interworking between IP telephony protocols. Although most of the examples described below relate to MGCP and H.323, it is understood that the method and apparatus described herein are applicable to any IP telephony protocol.

Many of the protocols described herein define an entity that is responsible for performing functions and requests on behalf of a telephony device. Typically, these functions and requests include translations, media capabilities exchange, and other services. The entities that perform the functions can be logical, physical, or both. For example, in MGCP, the MGC or call agent performs call signaling functions on behalf of a gateway. In H.323, the gatekeeper performs call signaling functions for an H.323 gateway. In SIP, a proxy server performs call signaling functions for an end user. In order to facilitate a description of the present invention, the term call server is used herein to refer to an entity that performs call signaling functions, such as translations and media capabilities exchange, on behalf of an end user device, gateway, or other entity.

According to a first aspect, the present invention includes a call server including a first protocol agent and a second protocol agent. The first protocol agent communicates with a first protocol device according to a first protocol. The second protocol agent communicates with a second protocol device according to a second protocol. An interworking agent provides functions usable by the first and second protocol agents to communicate using a third protocol. The third protocol provides a superset of the functions provided by the first and second protocols.

Accordingly, it is an object of the present invention to provide a novel method and apparatus for interworking between IP telephony protocols.

An object of the invention having been stated hereinabove, and which is achieved in whole or in part by the present invention, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawing of which:

FIG. 8 is a block diagram illustrating a connection information parameter data structure according to an embodiment of the present invention;

DETAILED DESCRIPTION OF THE INVENTION

The present invention provides a novel method and apparatus for interworking between IP telephony protocols. In order to provide this interworking, a call server includes agents that communicate with other entities according to the protocols implemented by the other entities. However, the protocol agents communicate with each other utilizing a protocol-independent agent interworking protocol (AIP). As a result, network entities that implement different protocols can seamlessly communicate with each other.

Figure 1:
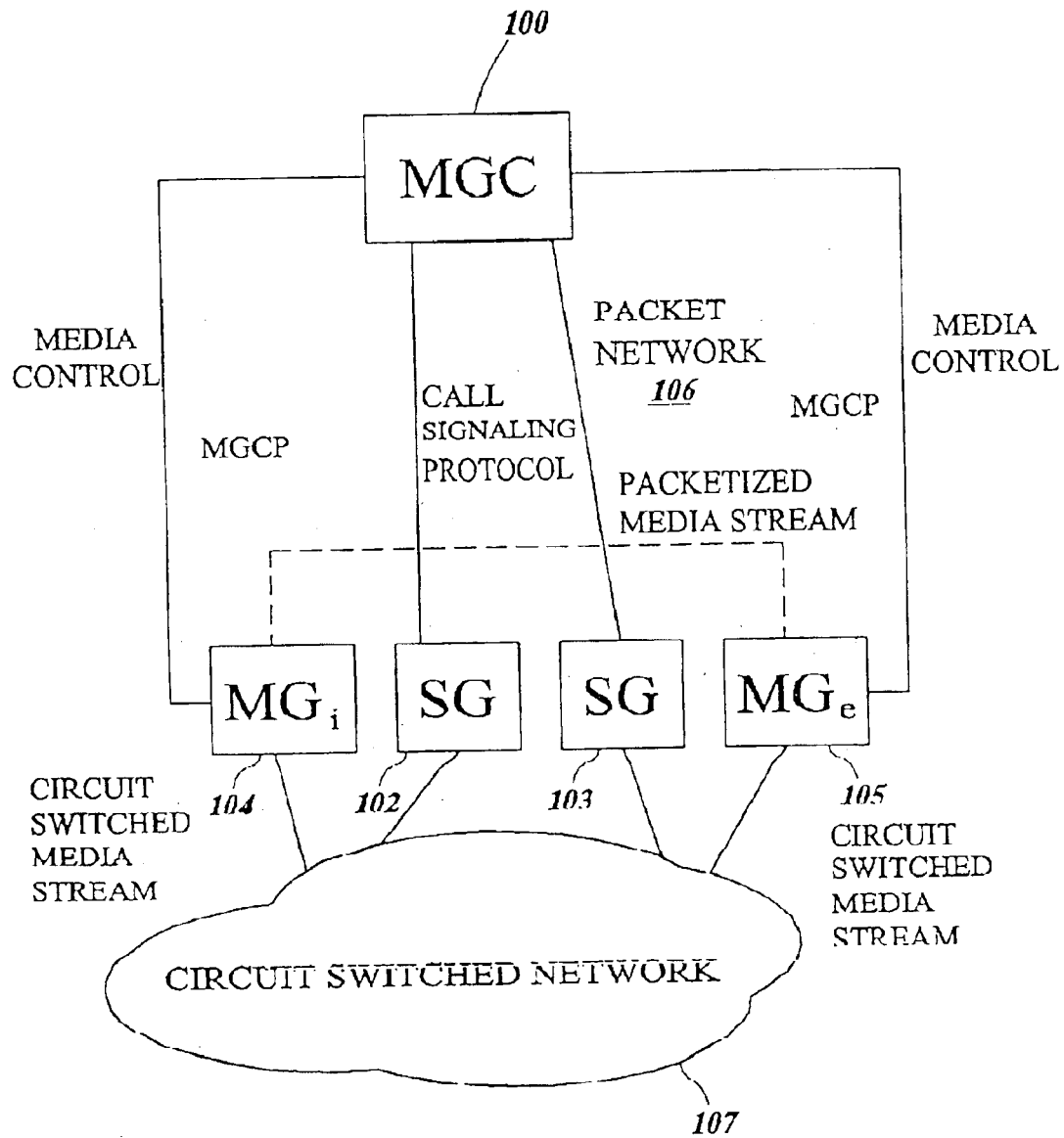
FIG. 1 is a block diagram illustrating conventional MGCP network entities.
Figure 2:
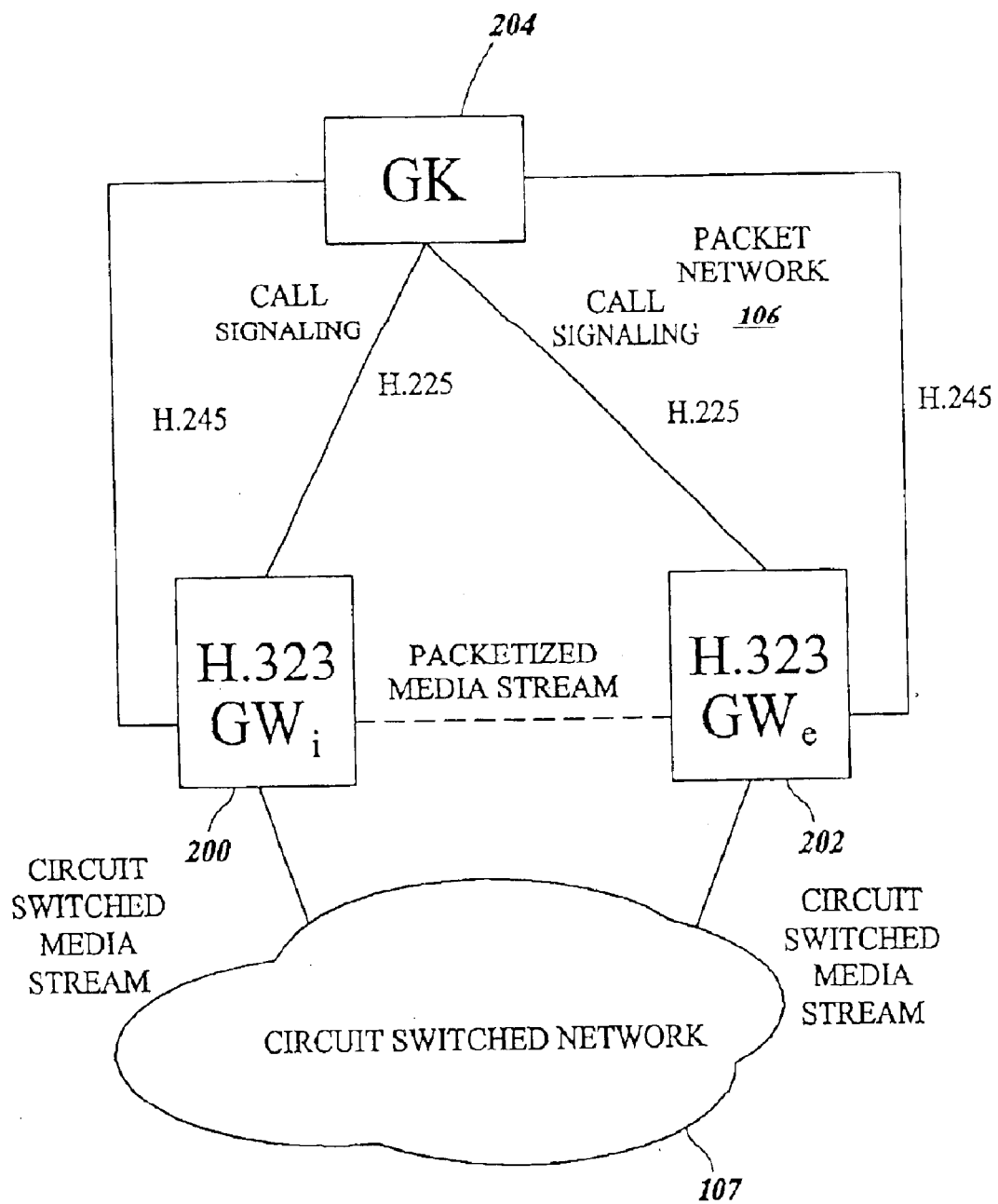
FIG. 2 is a block diagram illustrating conventional H.323 network entities.
Figure 3:
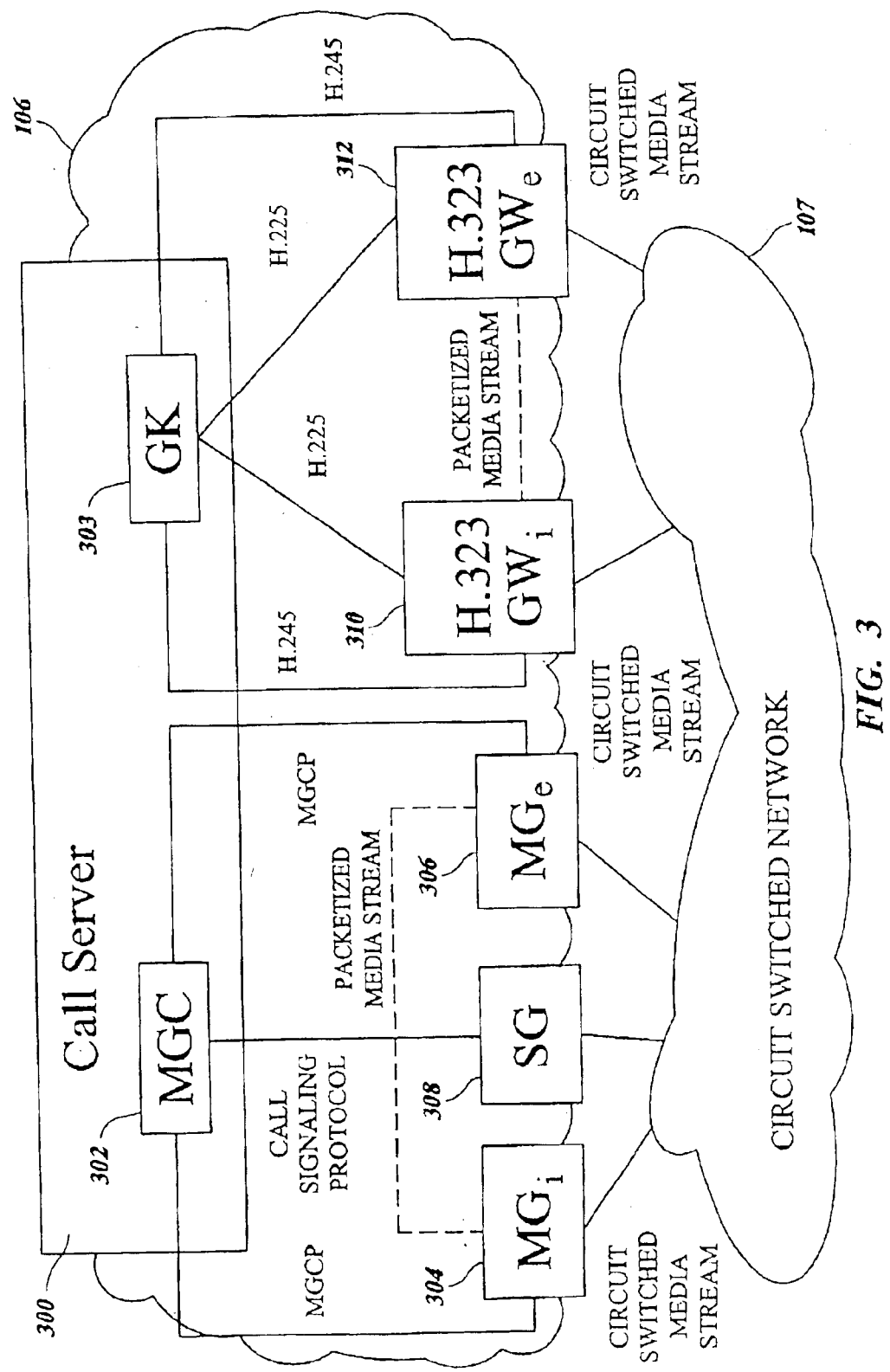
FIG. 3 is a block diagram illustrating media gateway controller and gatekeeper functions implemented within a call server according to an embodiment of the present invention.

FIG. 3 illustrates a call server including MGC and GK functions according to an embodiment of the present invention. In FIG. 3, a call server 300 includes an MGC function 302 and a GK function 303. The call server is a software entity that can execute on a single machine or on multiple machines. MGs and SGs recognize call server 300 as an MGC. H.323 endpoints, such as gateways, recognize call server 300 as a GK. For example, in the illustrated embodiment, ingress MG 304, egress MG 306, and SG 308 recognize call server 300 as an MGC. Similarly, ingress H.323 gateway 310 and egress H.323 gateway 312 recognize call server 300 as a gatekeeper.

In order for MGs 304 and 306 to recognize call server 300 as an MGC, MGC function 302 in call server 300 is adapted to communicate with MGs 304 and 306 using MGCP. Similarly, in order for SG 308 to recognize call server 300 as an MGC, MGC function 302 in call server 300 communicates with SG 308 using a call signaling protocol, such as ISDN Part (ISUP). In order for H.323 gateways 310 and 312 to recognize call server 300 as a gatekeeper, gatekeeper function 303 in call server 300 communicates with gateways 310 and 312 according to ITU Recommendations H.225 and H.245.

Figure 4:
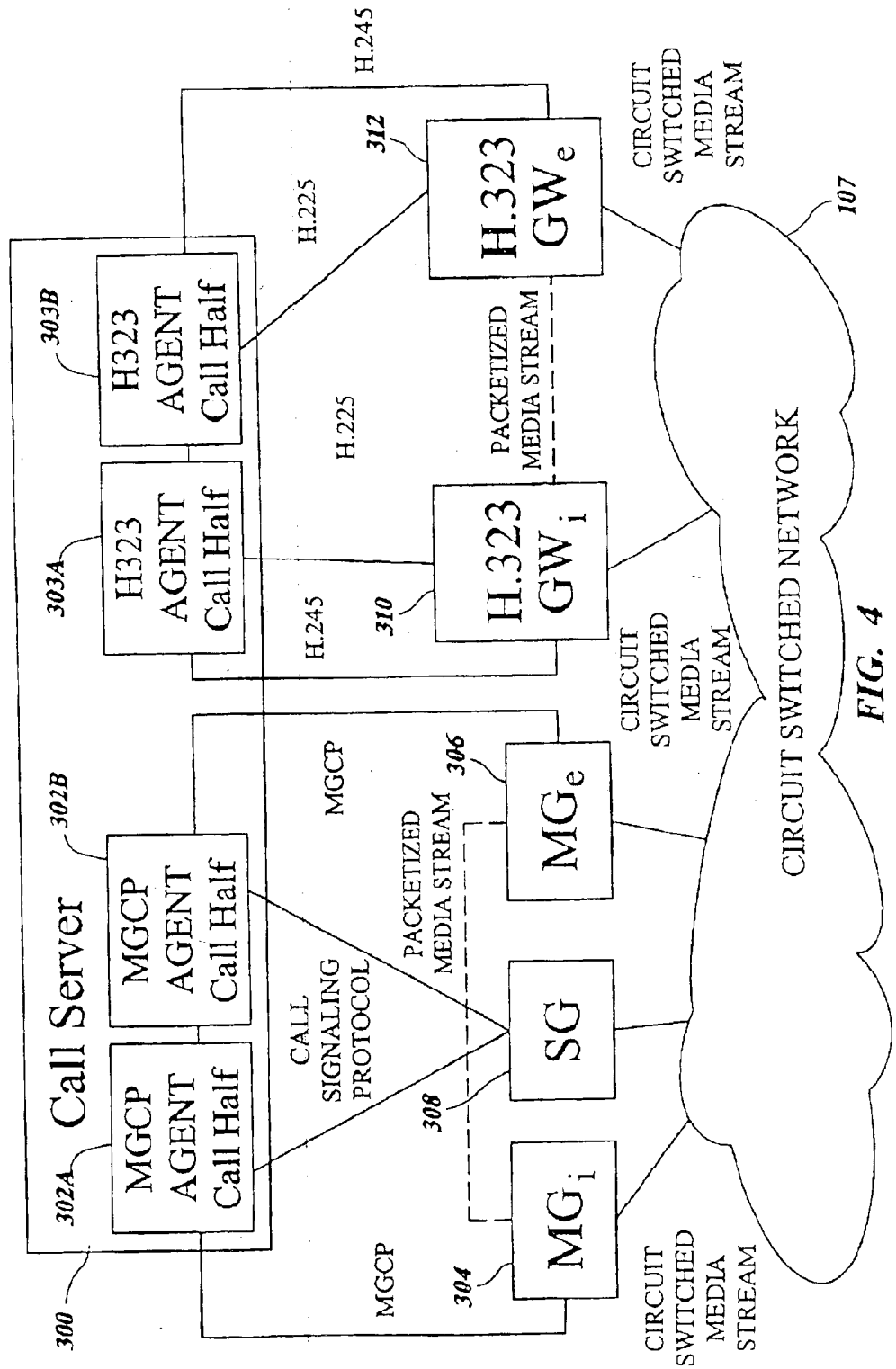
FIG. 4 is a block diagram illustrating a call server wherein each call half is represented by an agent according to an embodiment of the present invention.

FIG. 4 illustrates an embodiment of call server 300 in which the call processing functions illustrated in FIG. 3 are separated into call agents, each of which performs call half functions. As used herein, call half functions refer to functions associated with either the originating or terminating side of a call. For example, in FIG. 4, MGCP function 302 illustrated in FIG. 3 is divided into MGCP agent 302A and MGCP agent 302B. Similarly, H.323 function 303 illustrated in FIG. 3 is divided into H.323 agent 303A and H.323 agent 303B. MGCP agent 302A and H.323 agent 303A can perform call originating functions, such as collection of digits and translations. MGCP agent 302B and H.323 agent 303B can perform call terminating functions, such as trunk selection and alerting the called party of an incoming call. The functions performed by each call half will be explained in detail below with reference to call flow diagrams.

Figure 5:
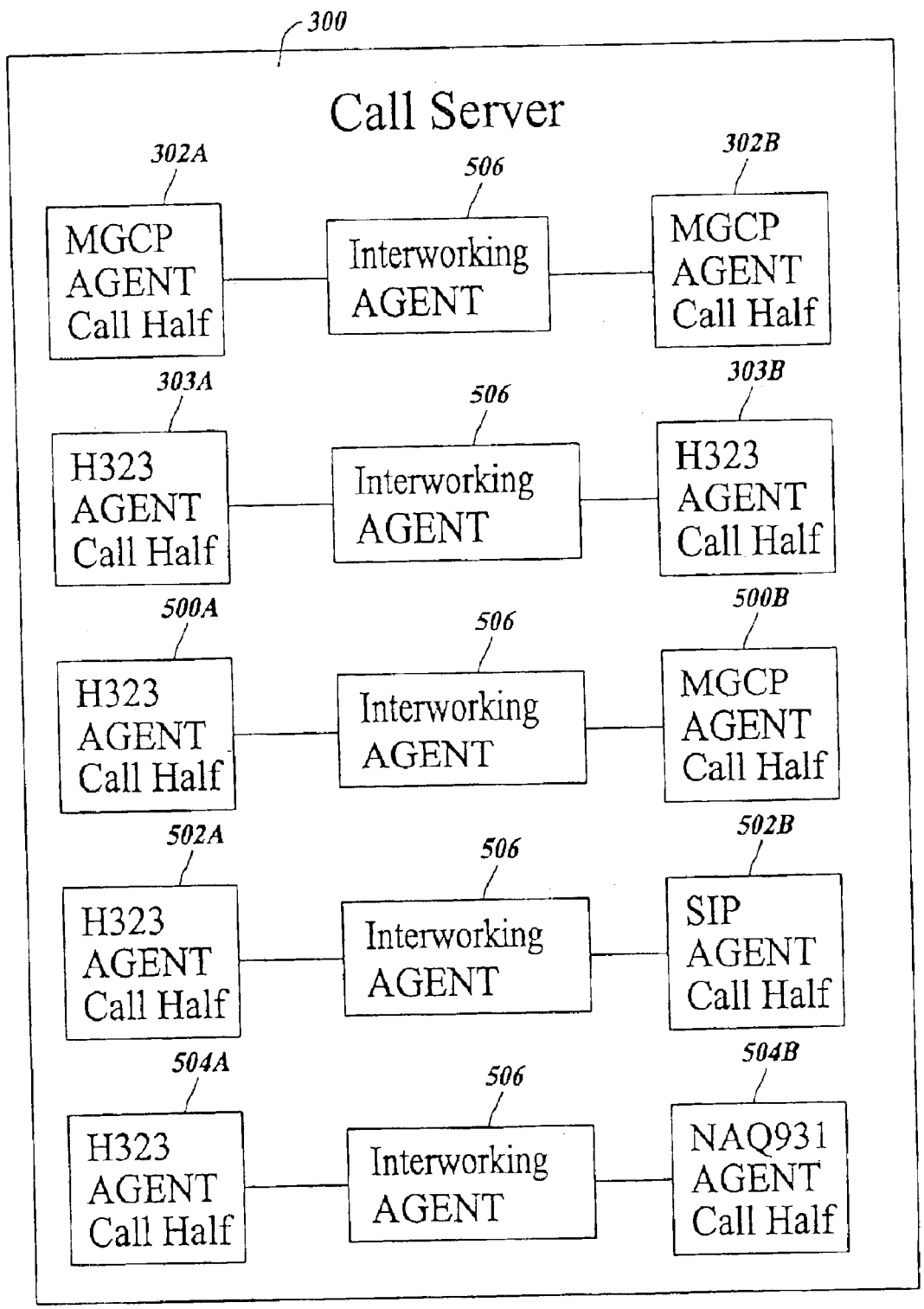
FIG. 5 is a block diagram illustrating a call server including a plurality of interworking agents according to an embodiment of the present invention.

As mentioned above, the present invention is not limited to interworking between MGCP and H.323 entities. For example, FIG. 5 illustrates a call server including protocol agents configured to communicate with other agents using a variety of different protocols. In the illustrated embodiment, call server 300 includes MGCP agents 302A and 302B for processing MGCP to MGCP calls, H.323 agents 303A and 303B for processing H.323 to H323 calls, H.323 agent 500A and MGCP agent 500B for processing H.323 to MGCP calls, H.323 agent 502A and SIP agent 502B for processing H.323 to SIP calls, and H.323 agent 504A and NAQ.931 agents 504B for processing H.323 to NAQ.931 calls. In addition, to the protocol agents, call server 300 also includes an interworking agent 506 which facilitates communication between protocol agents. More particularly, interworking agent 506 includes methods for getting and setting AIP parameters, building AIP messages, and establishing and maintaining connections, such as TCP or reliable UDP connections, between protocol agents. Interworking agents can also identify AIP message types, which will be described in more detail below. Thus, as illustrated in FIG. 5, interworking agent 506 provides functions usable by a variety of different protocol agents to provide seamless interworking between the protocol agents.

In a preferred embodiment of the invention, the interworking agent is divided into separate software components, one component associated with the protocol agent for each call half. The division of the interworking agent into two software components allows protocol agents associated with a given call to execute on separate machines.

Figure 6:
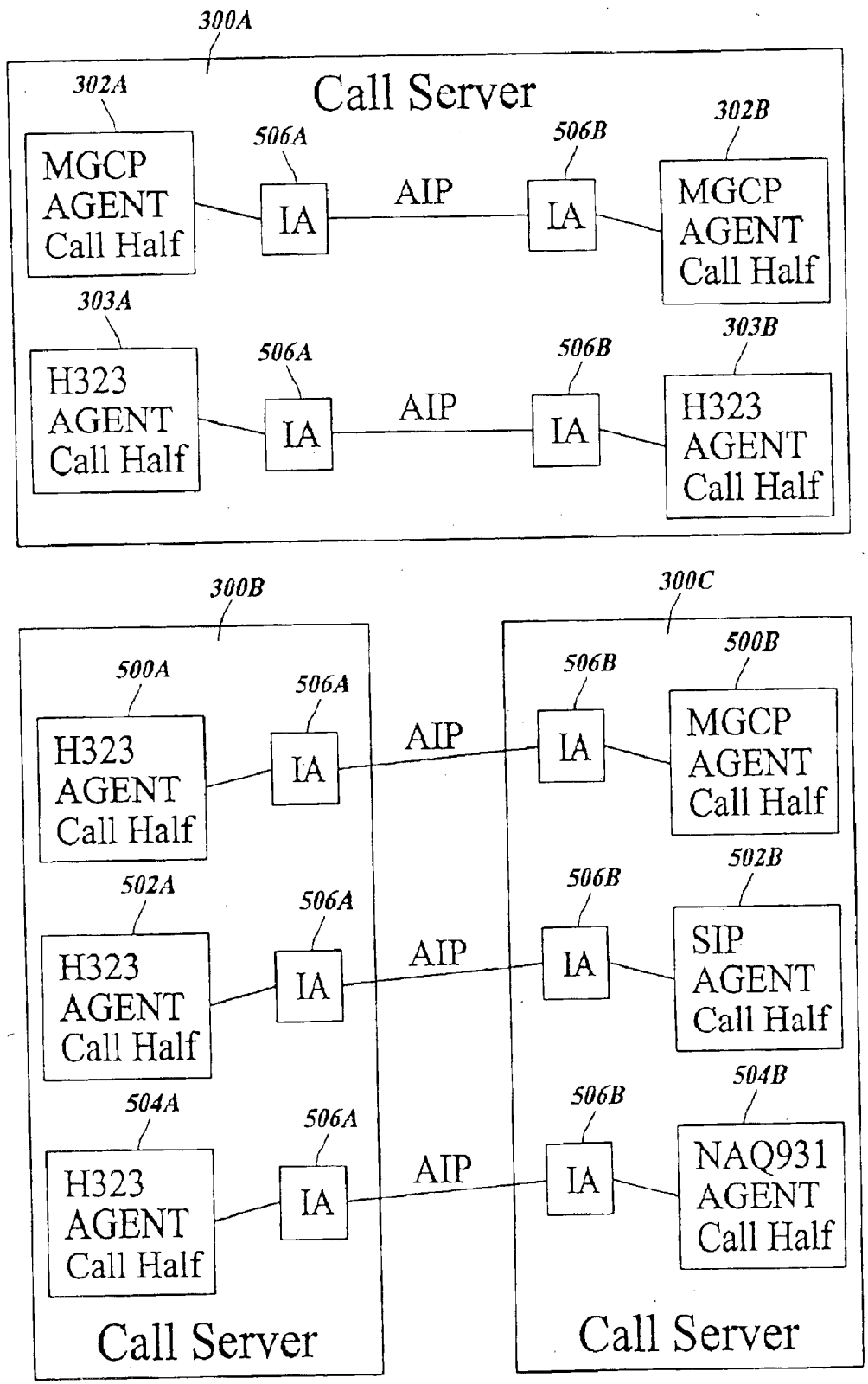
FIG. 6 is a block diagram illustrating protocol agents implementing originating and terminating call half functions executing on different machines wherein an interworking agent is associated with each protocol agent.

Referring to FIG. 6, call server 300 illustrated in FIG. 5 is divided into call servers 300A, 300B, and 300C, which can execute on the same machine or on different machines. Call server 300A includes protocol agents that perform both originating and terminating call half functions. Call servers 300B and 300C each include protocol agents that perform only originating or terminating call half functions. This division of call processing functionality is enabled by interworking agents components 506A and 506B, which enable protocol agents to communicate with each other using AIP messaging. Exemplary information that can be exchanged using AIP messaging includes information regarding call progress, media capabilities and addresses, supplementary services, etc. By allowing the protocol agents to reside on separate machines, the interworking agents according to embodiments of the present invention allow efficient division of call processing functions.

Figure 7:
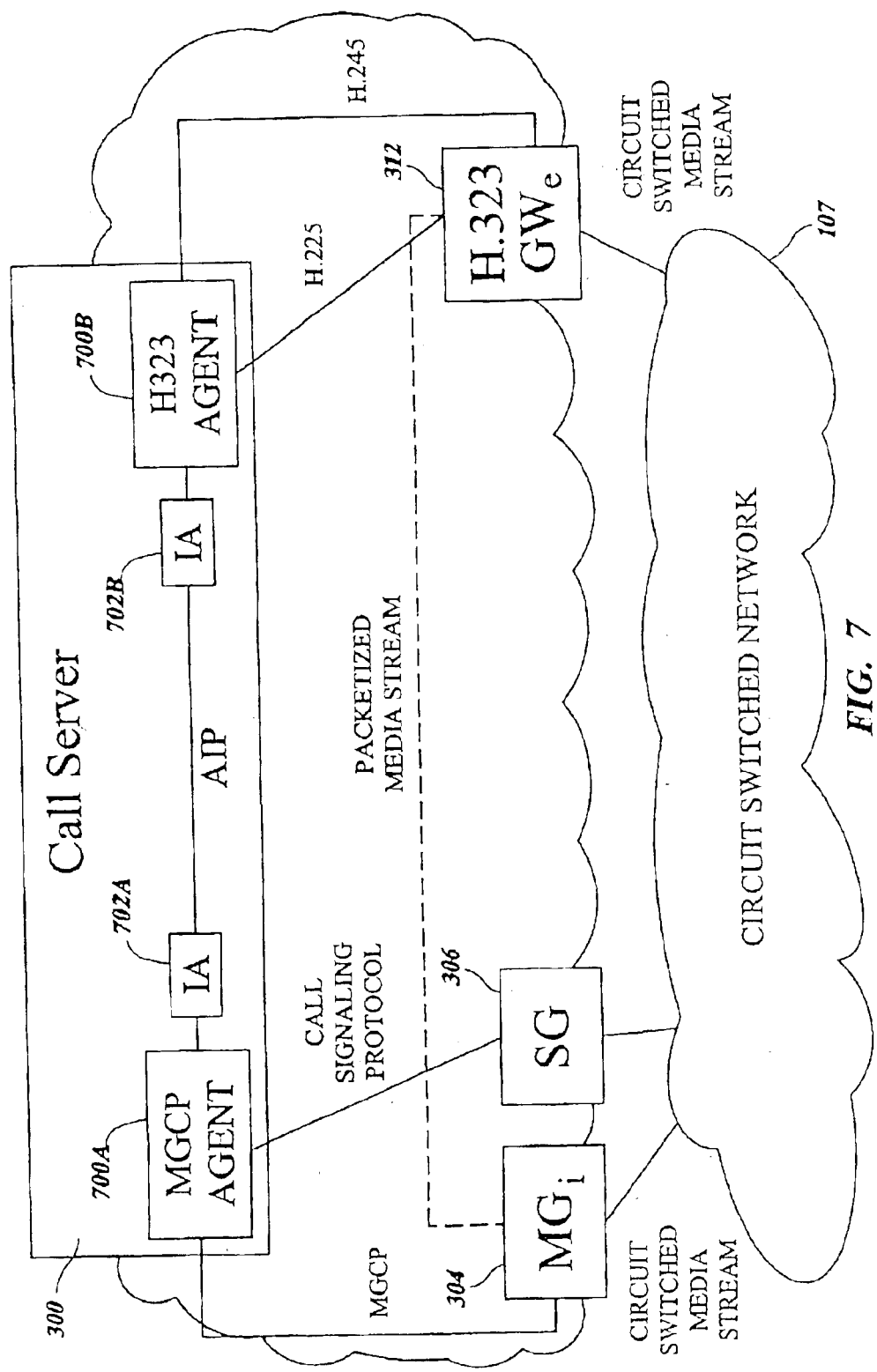
FIG. 7 is a block diagram illustrating a call server including MGCP, interworking, and H.323 agents for interworking MGCP and H.323 entities according to an embodiment of the present invention.

FIG. 7 illustrates an example of an MGCP-H.323 network typology wherein communication between MGCP and H.323 endpoints occurs through a call server according to an embodiment of the present invention. In FIG. 7, call server 300 includes MGCP agent 700A for performing originating call half functions according to the media gateway control protocol and H.323 agent 700B for performing terminating call half functions according to the H.323 protocol. More particularly, MGCP agent 700A communicates with ingress media gateway 304 according to the media gateway control protocol and with signaling gateway 306 according to a call signaling protocol, such as ISUP. H.323 agent 700B communicates with H.323 gateway 312 according to H.225 and H.245 protocols. MGCP agent 700A and H.323 agent 700B communicate with each other using AIP messaging. Interworking agent components 702 and 702B provide the functions that protocol agents 700A and 700B use to formulate and process AIP messages.

Because the interworking agent components 702A and 702B provide functions for converting messages to and from a protocol independent format, MGCP agent 700A and the H.323 agent 700B need not be aware of each other's protocol. Similarly, MG 304 and SG 306 need not be aware of the protocol of H.323 gateway 312, and H.323 gateway 312 need not be aware of the protocol of MG 304 and SG 306.

Agent Interworking Protocol

As stated above, interworking agents according to embodiments of the present invention communicate with each other according to a protocol independent format referred to as the agent interworking protocol. The agent interworking protocol is preferably capable of representing a reasonable superset of the messaging capabilities of all protocols to be supported within the packet network. Designing an interworking protocol that supports all of the capabilities of all of the supported protocols is an unnecessarily burdensome task since some capabilities are rarely used or are only useful when communicating between devices that support the particular protocol. In addition, these rarely used capabilities can be communicated between agents that support these capabilities using tunneling, as will be described in more detail below. Accordingly, it is desirable that the agent interworking protocol provide a reasonable superset of the capabilities of supported protocols.

Rather than designing an entirely new protocol for use as the agent interworking protocol, it is more desirable to select an existing protocol that comes close to meeting the superset definition described above and extending that protocol. Existing protocols that could be used as the base protocol for the agent interworking protocol include Q.931, ISUP, and SIP. The agent interworking protocol implemented in interworking agents according to preferred embodiments of the present invention is based upon ISUP. For example, AIP includes traditional ISUP messages such as initial address messages (IAM), answer messages (ANM), and release messages (REL). The agent interworking protocol extends the base protocol to include additional procedures and signaling required to meet interoperability requirements. The functions and data structures used in the agent interworking protocol to meet these requirements will now be discussed in more detail.

One function that must be provided by the agent interworking protocol is a method for exchanging media capabilities between protocol agents. Each of the agent protocols to be interworked provide some means by which a telephony device can make known the media capabilities that it supports. These capabilities must be exchanged between two devices that desire to participate in a media stream communication in order to select a mutually compatible media session definition.

Capabilities Exchange Between H.323 Devices

H.323 allows an endpoint to advertise its capabilities at two different times—during call establishment and after call establishment. For example, some H.323 devices support fast start capabilities which allow a partial list of media capabilities to be exchanged in H.225 call establishment messages. This method of exchanging capabilities allows faster establishment of a media stream between endpoints because capabilities are exchanged during call signaling, rather than waiting until after call signaling has been completed. In order to exchange capabilities after call establishment, H.323 compliant devices use H.245 signaling to provide a full description of all media capabilities supported.

Capabilities Exchange Between MGCP and SIP Devices

MGCP and SIP support the use of the session description protocol (SDP) for encoding the capabilities supported by the device. The session description protocol is included in call establishment messages similarly to H.323 fast start messages. For example, a SIP call establishment message, such as an INVITE message, includes an SDP portion in the body of the message. The SDP portion includes the capabilities supported by the endpoint, such as encoding and decoding algorithms, type of media stream, etc.

Because these capabilities can be exchanged during call setup or after call establishment, the agent interworking protocol implemented in call servers according to embodiments of the present invention is preferably flexible enough to support capabilities exchange at either time. In addition, because each of the above-mentioned protocols uses different syntax for specifying the capability's definition, AIP preferably provides a normalized syntax to which interworking agents can map the capability's definitions.

Media Management

In addition to providing a method for exchanging media capabilities, the agent interworking protocol preferably also provides media management capabilities that include a reasonable superset of the media management capabilities of supported protocols. For example, each of the agent protocols provide support for establishing and altering media streams; however, the specific protocols vary significantly. H.323 fast start procedures allow H.323 devices to establish a media stream in concert with call establishment. However, fast start is optional and might not be supported by a given H.323 device. H.245 procedures allow H.323 devices to open and close media channels post call establishment. H.323 is very limited in its ability to alter a media stream once established. H.323 media streams can be unidirectional or bi-directional. Voice/audio media is typically represented via two independent unidirectional streams on IP networks with bi-directional media being typically used for data or for voice on ATM networks.

MGCP supports establishment of media streams during call establishment similar to H.323 fast start procedures. Media streams can be either unidirectional or bi-directional and can be changed from one format to the other at any time during a call. MGCP allows media channels to be modified in a variety of ways without having to be closed. For example, a media stream can be redirected by changing the receiving real time protocol (RTP) address. The encoding format can be changed by changing the codec. The mode can be changed to send only, send receive, receive only, or inactive. SIP is similar to MGCP in its ability to modify media streams.

In order to provide an interworking solution that accommodates these agent protocols, three design objectives are preferably met. The first design objective is that the agent interworking protocols must provide sufficient flexibility to meet the requirements of all agent protocols. Second, the agent design preferably maps between agent specific and AIP procedures and syntax for media management. The third objective is that a flexible control framework is preferably implemented that allows the agent to easily react to media changes made by the agent implementing the other call half. The connection information parameter illustrated in FIG. 8 is the mechanism provided by the agent interworking protocol for implementing media management functions and exchanging media capabilities. The times for exchanging media capabilities and performing media management functions according to the agent interworking protocol will be described in more detail below with respect to the call flow diagrams.

FIG. 8 is a table illustrating exemplary fields and field values for the connection information parameter according to an embodiment of the present invention. In FIG. 8, the left hand column represents the fields in the connection information parameter data structure. The right hand column represents example values for each of the fields in the left hand column. In the illustrated embodiment, the connection information parameter includes a media type field 800 that holds a media type value 802 for specifying the type of media being exchanged or sought to be exchanged in a media stream. Example values for the media type field include audio, video, and data. Channel ID field 804 includes an internally assigned channel ID value that allows an interworking agent to identify the media stream. In the illustrated embodiment, 12345 is given as an example value 806 for channel ID field 804. Channel operation field 808 includes a channel operation value 810 for specifying the operation being performed on the media stream. Values 810 for the channel operation field 808 are preferably a superset of protocol media stream operations for the supported protocols. In the illustrated embodiment, exemplary values for the channel operation field are no action, open, close, modify, mode change, redirect, direct, and send capabilities. The no action value indicates that no change is being made to the existing media stream. The open value specifies that a media stream is sought to be opened. The close value indicates that an open media stream is sought to be closed. The modify value indicates that the media stream is sought to be modified, e.g., changing a codec from G.711 to G.729a. The mode change value indicates that the mode of the media stream is sought to be changed, e.g., from send only to receive only. The redirect value indicates that the media stream is to be redirected to another endpoint. The direct value specifies the location to which the media stream is to be directed. The send capabilities value requests the receiving entity to transfer the media capabilities list.

Current media description field 812 stores current media description value 814 for indicating the description of the current media stream. In the illustrated embodiment, an example of a current media description value is G.711 at two frames per packet. Media capabilities field 816 includes media capabilities value or values 818 that allows an entity to exchange its media capabilities with another entity. In the illustrated example, the media capabilities field includes a list of supported formats, such as G.711, G.729. Media capabilities field 818 also includes a payload size value that specifies the size of media capabilities field. Media capabilities field 818 also includes a redefinable area in which information specific to the type of media and codes can be specified. For example, a facsimile media stream requires certain attributes that are not required for other media types. The redefinable area allows this information to be specified.

Message Tunneling

As described above, the agent interworking protocol represents a reasonable superset of the agent protocols sufficient to achieve interworking. However, the agent interworking protocol is not a complete superset of the supported protocols. That is, certain agent protocols can contain messages or parameters which do not map to any other agent protocols, but provide added value for a call between two devices of the same type. In this case, the agent interworking protocol preferably supports tunneling of the native protocol message. As used herein, tunneling refers to transferring the native protocol message from one protocol agent to another protocol agent without converting to and from the agent interworking protocol. The agent receiving the native protocol message can inspect the message, and if the agent understands the message, process the message accordingly.

An example of when it might be desirable to tunnel a message relates to H.323. H.323 provides a sophisticated means of representing terminal capabilities in sets. The agent interworking protocol, as described herein, might not include functionality for representing terminal capabilities in sets as defined in H.323, because the other protocols do not support such capability. Another capability that H.323 supports which can not be supported by other protocols is the exchange of H.245 indications between two H.323 devices. Some of these indications have no equivalent mapping to other agent protocols. In these situations, it can be desirable to tunnel the H.323 messages from one agent to another agent.

Method of Tunneling Messages

According to an embodiment of the present invention, interworking messages can be of three types:

Agent Interworking protocol messages—protocol-neutral messages understood by all protocol agents;

Native protocol messages—protocol-specific messages, such as SIP, MGCP, and H.323 messages;

Multipart messages—messages that contain multiple other messages, such as native protocol messages and AIP messages. All agents are preferably capable of extracting the AIP message and processing the message accordingly. If the multipart message contains a native protocol message, this message is preferably processed if supported.

Figure 9A:
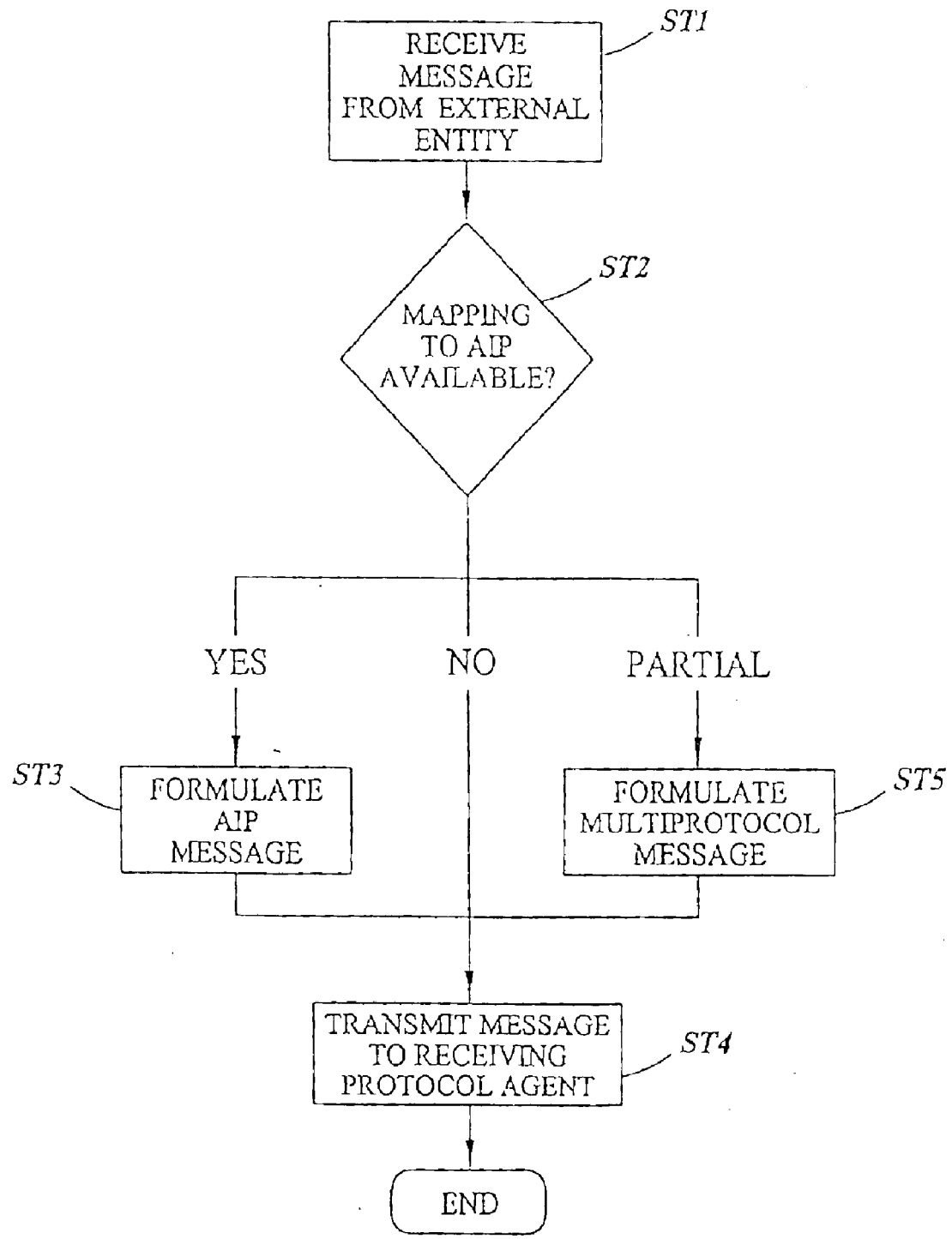
FIGS. 9(a) and 9(b) are flow charts illustrating message tunneling according to an embodiment of the present invention.
Figure 9B:
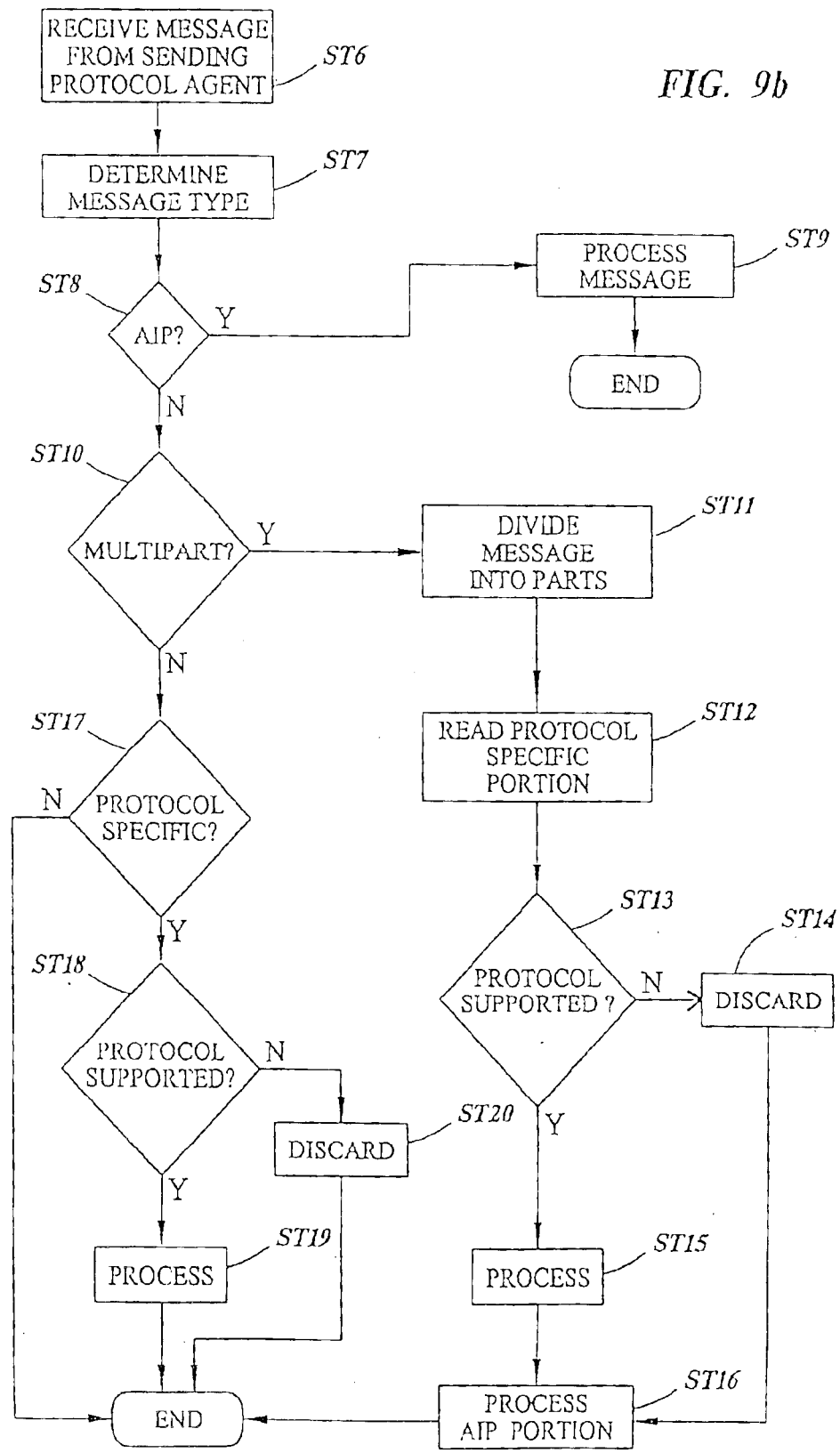

FIGS. 9(a) and 9(b) are flow charts illustrating exemplary formulating and processing of interworking messages by a call server according to an embodiment of the present invention. The flow chart in FIG. 9(a) illustrates exemplary steps that can be performed by a sending protocol agent in formulating an interworking message using procedures provided by an associated interworking agent. The flow chart in FIG. 9(b) illustrates exemplary steps that can be performed by a receiving protocol agent using procedures provided by an associated interworking agent upon receiving an interworking message. Referring to FIG. 9(a), in step ST1, the sending protocol agent receives a message from an external entity, such as an H.323 gateway. In step ST2, the sending protocol agent determines whether a mapping is available to the agent interworking protocol. In step ST3, if a mapping is available, the sending protocol agent formulates the corresponding AIP message using functions provided by the interworking agent associated with the sending protocol agent (hereinafter, "the first interworking agent") and transmits the message to the receiving protocol agent (step ST4). In step ST2, if the sending protocol agent determines that the mapping to the agent interworking protocol is not available, the sending protocol agent simply transmits the protocol message without modification to the receiving protocol agent (step ST4). In step ST2, if the sending protocol agent determines that a mapping to AIP is partially available, the sending protocol agent can formulate a multiprotocol message including the AIP message and the native protocol message (step ST5). The sending protocol agent can then transmit the multiprotocol message to the receiving protocol agent (step ST4).

Referring to FIG. 9(b), in step ST6, the receiving protocol agent receives the message from the sending protocol agent. In step ST7, receiving protocol agent determines the message type, i.e., whether the message is a protocol specific message, an agent interworking protocol message, or a multipart message, using procedures provided by its associated interworking agent (hereinafter, "the second interworking agent").

In step ST8, if the receiving protocol agent determines that the message is an agent interworking protocol message, the receiving protocol agent processes the message (step ST9). In step ST10, the receiving protocol agent determines whether the message is a multipart message. If the message is a multipart message, the receiving protocol agent separates the multi-protocol message into its component messages (step ST11). After the receiving protocol agent separates the message, the receiving protocol agent reads the protocol specific portion of the AIP message (step ST12). In step ST13, the receiving protocol agent determines whether the protocol in the protocol specific portion is supported. If the protocol is not supported, the receiving protocol agent discards the message (step ST14). If the protocol is supported, the receiving protocol agent processes the message (step ST15). In step ST16, the receiving protocol agent processes the AIP portion of the message.

Referring to step ST17, if the receiving protocol agent determines that the message is a protocol specific message, the receiving protocol agent determines whether the protocol of the message is supported (step ST18). If the protocol is supported, the receiving protocol agent processes the message (step ST19). If the protocol is not supported, the receiving protocol agent discards the message (step ST20).

Transport Mechanism for Agent Interworking Messages

Interworking messages can be sent between protocol agents using any packet based protocol, for example, TCP, UDP, etc. In a preferred embodiment of the invention, interworking messages are transmitted between interworking agents using TCP over IP. As is known in the art, an IP message includes a header portion and a data portion. A TCP message is encapsulated in the data portion of the IP message. The TCP message also includes a header portion and a data portion. Interworking messages are encapsulated in the data portion of the TCP message. Interworking messages also include a header portion and a data portion. The header portion indicates the message type, i.e., AIP, protocol-specific, or multipart.

Figure 10:
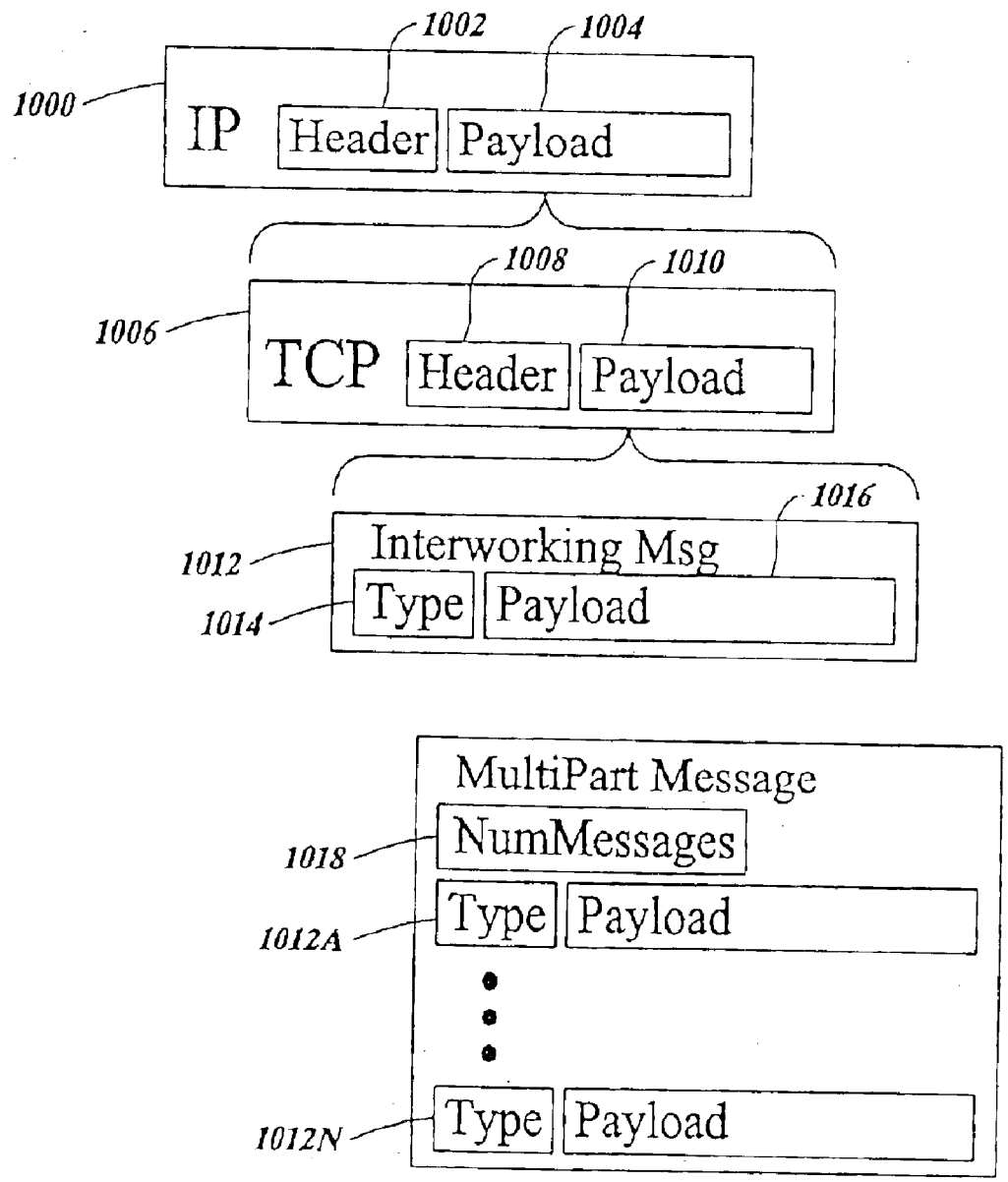
FIG. 10 is a block diagram illustrating exemplary agent interworking protocol message structures according to an embodiment of the present invention.

FIG. 10 illustrates the relationships between IP messages, TCP messages, and interworking messages. In FIG. 10, IP message 1000 includes a header portion 1002 and a data portion 1004. TCP message 1006 is encapsulated in data portion 1004 of IP message 1000. TCP message 1006 includes a header portion 1008 and a data portion 1010.

Interworking message 1012 is encapsulated in data portion 1010 of TCP message 1006. Interworking message 1012 includes a header portion 1014 for indicating the message type and a data portion 1016 containing the actual message. If the header portion 1014 indicates that the interworking message is a multipart message, data portion 1016 of interworking message 1012 includes a first field 1018 indicating the number of messages present in the multipart message. After the first field, the multipart message can include one or more interworking messages 1012A to 1012N.

DTMF Digit Handling

Another extension of the base protocol provided by the agent interworking protocol is dual tone multifrequency (DTMF) digit handling. Numerous studies have concluded that encoding and transporting DTMF digits within the media stream is not suitable for supporting networked services, such as credit card validation, automated services, and voice mail, which require DTMF digit recognition. Some of these services require recognition not only of the tone being transmitted but also of the duration of the tone. Algorithms for encoding voice and data can distort the tone and/or change the duration of the tone sought to be transmitted. As a result, the receiving application might not be able to correctly interpret the tone.

Currently, a fully standardized approach for handling the transport of DTMF digits after call establishment is not defined. The approach that is currently in the most favor is to encode DTMF digits as a special real time protocol (RTP) payload type that is exchanged between devices participating in the media stream. If this approach is standardized, various digital signal processor (DSP) manufacturers must comply with the standard before interworking will be accomplished. Because this involves a hardware change, much time can elapse before this occurs.

Figure 11:
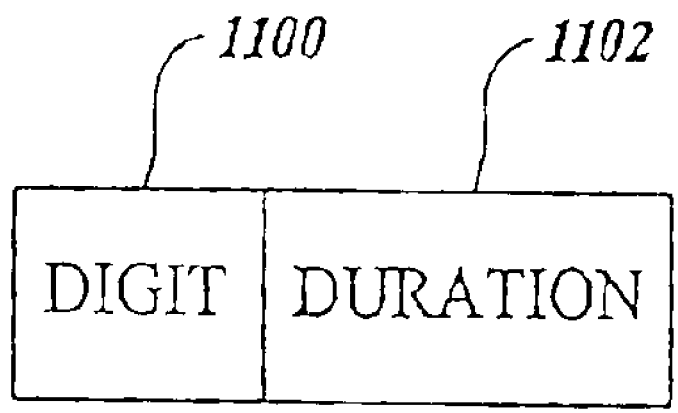
FIG. 11 is a block diagram illustrating an exemplary data structure for a digit information parameter according to an embodiment of the present invention.

As a current solution to the problem, some of the agent protocols have implemented out-of-band techniques for handling DTMF digits. The agent interworking protocol according to embodiments of the present invention preferably provides a mapping to and from the out-of-band DTMF digit handling techniques of supported protocols. In order to provide a method for communicating DTMF information between protocol agents, the agent interworking protocol defines a data structure referred to herein as the digit information parameter. FIG. 11 illustrates an exemplary digit information parameter data structure. In the illustrated embodiment, the digit information parameter data structure includes a digit field 1100 and a duration field 1102. Digit field 1100 is capable of storing a digit value indicative of the DTMF digit being transmitted. For example, the digit field can contain a numerical value that indicates one of the keys on a telephone handset. Duration field 1102 stores a duration value for indicating the duration of the tone represented by the digit in the digit field. Specific examples of when the digit information parameter is exchanged will be explained below with reference to the call flow diagrams.

Interworking Examples

A. H.323 Fast Start to MGCP

Figure 12:
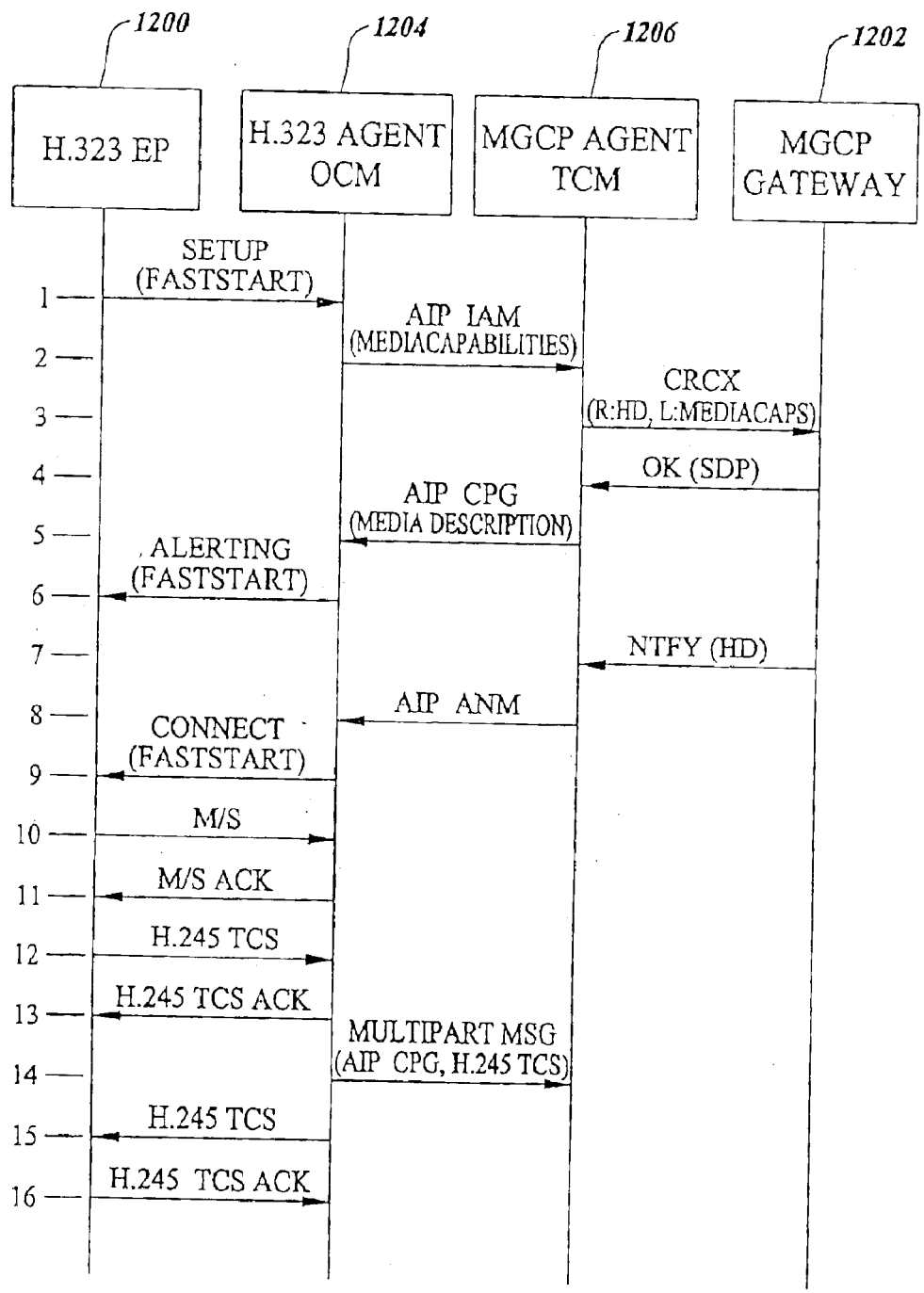
FIG. 12 is a call flow diagram illustrating exemplary call signaling for H.323 fast start to MGCP communications according to an embodiment of the present invention.

FIG. 12 is a call flow diagram illustrating exemplary call signaling performed by H.323 and MGCP agents including interworking agent capabilities according to an embodiment of the present invention. In FIG. 12, H.323 endpoint 1200 is seeking to establish a call with an MGCP endpoint through MGCP gateway 1202. MGCP gateway 1202 performs both signaling gateway and media gateway functions. H.323 agent 1204 includes interworking agent functionality and implements an originating call model. MGCP agent 1206 includes interworking agent functionality and implements a terminating call model.

In line 1 of the call flow diagram, H.323 endpoint 1200 sends a SETUP message to H.323 agent 1204. The SETUP message includes fast start parameters that specify suggested media options for the initial media stream. In line 2 of the call flow diagram H.323 agent 1204 sends an agent interworking protocol initial address message (IAM) to MGCP agent 1206.

The AIP IAM message contains the media capabilities definition mapped from the fast start parameters extracted from the SETUP message. In line 3 of the call flow diagram, MGCP agent 1206 sends an MGCP create connection (CRCX) message to MGCP gateway 1202. The CRCX message contains local connection options that are mapped from the AIP media capabilities information extracted from the IAM message into MGCP format. In line 4 of the call flow diagram, MGCP gateway 1202 sends an OK message to MGCP agent 1206. The OK message includes a media capability selected by MGCP gateway 1202 from the media capabilities specified in the CRCX message. The media description for the selected capability is returned in the SDP portion of the OK message.

In line 5 of the call flow diagram, MGCP agent 1206 sends an AIP call progress (CGP) message to H.323 agent 1204. An AIP CPG message is used to signal events other than release and answer between protocol agents implementing different call halves. In the illustrated example, the CPG message includes a mapping of the SDP portion of the OK message into AIP format. In addition, any other media capabilities which the MGCP agent is capable of supporting can be included in the media description. In line 6 of the call flow diagram, H.323 agent 1204 transmits an ALERTING message to H.323 endpoint 1200. H.323 agent 1204 maps the media description from the AIP CPG message into fast start parameters and includes the fast start parameters in the ALERTING message. Any additional capabilities that were received by the H.323 agent are stored for later usage.

In line 7 of the call flow diagram, when the MGCP end user answers the call, signaling gateway 1202 sends a NOTIFY message to MGCP agent 1206. The NOTIFY message alerts MGCP agent 1206 of the off-hook event. In line 8 of the call flow diagram, in response to the NOTIFY message, MGCP agent 1206 transmits an AIP answer message (ANM) to H.323 agent 1204.

In line 9 of the call flow diagram, in response to the answer message, H.323 agent 1204 transmits a CONNECT message to H.323 endpoint 1200. In lines 10 and 11 of the call flow diagram, H.323 endpoint 1200 and H.323 agent 1204 exchange master/slave and master/slave acknowledge messages. These messages are sent according to H.245 master/slave determination. This determination is made to resolve conflicts in media formats. H.323 agent 1204 handles the exchange and does not map the exchange to the agent interworking protocol.

In line 12 of the call flow diagram, H.323 endpoint 1200 transmits an H.245 terminal capabilities set (TCS) message to H.323 agent 1204 to communicate the media capabilities of endpoint 1200 to H.323 agent 1204. In line 13, H.323 agent 1204 acknowledges the TCS message. In line 14 of the call flow diagram, H.323 agent 1204 transmits a multipart message to MGCP agent 1206. The multipart message includes the capabilities of the H.323 device mapped into AIP format. The capabilities are sent to MGCP agent 1206 in the AIP CPG message. Optionally, the H.245 representation of the TCS can be sent as well. In this case, a multipart message is sent between call halves. The multipart message includes both the AIP CPG message and the H.245 TCS message. Because MGC 1206 might not support H.245 TCS, MGCP agent 1206 might, i.e., if H.245 TCS is not supported, discard the TCS portion of the multipart message and process only the AIP portion.

In lines 15 and 16 of the call flow diagram, H.323 endpoint 1200 and H.323 agent 1204 exchange TCS and TCS ACK messages. In this exchange, the capabilities of the other end, i.e., of MGCP gateway 1202, which were received and stored upon receipt of the CPG message in line 5 of the call flow diagram, are sent to H.323 endpoint 1200 as an H.245 terminal capability set.

H.323 Non-Fast Start to MGCP

Figure 13:
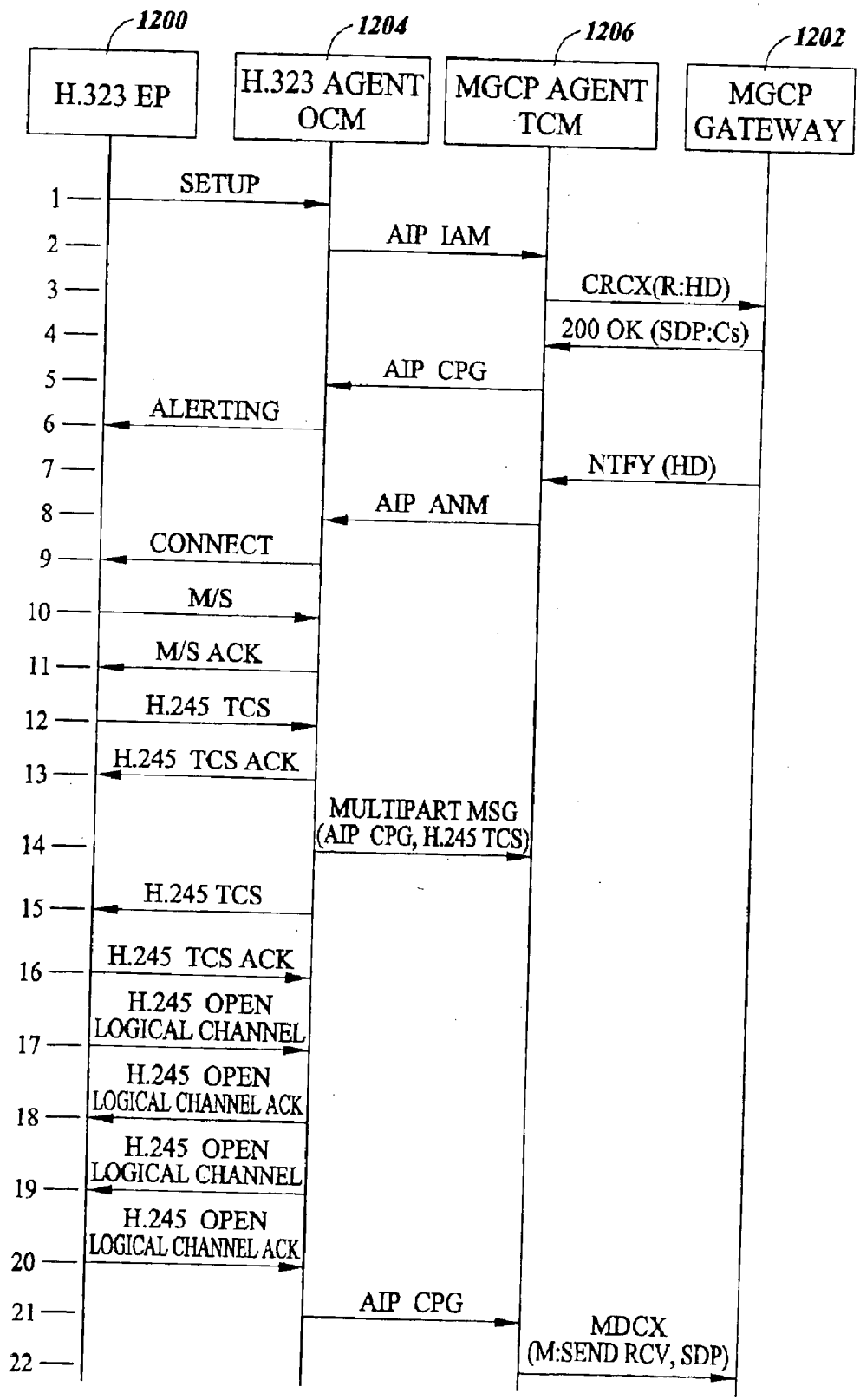
FIG. 13 is a call flow diagram illustrating H.323 non-fast-start to MGCP communications according to an embodiment of the present invention.

While FIG. 12 illustrated H.323 to MGCP interworking for H.323 fast start procedures, FIG. 13 illustrates H.323 to MGCP interworking without fast start procedures. In other words, in FIG. 13, the H.323 media capabilities are not exchanged until after call establishment. The entities involved in communications in FIG. 13 are the same as those illustrated in FIG. 12. Thus, a description of these entities is not repeated herein.

Referring to FIG. 13, in line 1 of the call flow diagram, H.323 endpoint 1200 sends a SETUP message to H.323 agent 1204. The SETUP message does not include fast start parameters. In line 2 of the call flow diagram, H.323 agent 1204 transmits an AIP IAM message to MGCP agent 1206. The IAM message contains no media description. In other words, the connection information parameter is either not included or set to a null value. In line 3 of the call flow diagram, MGCP agent 1206 transmits a CRCX message to MGCP gateway 1202. The CRCX message can optionally contain a default set of media capabilities that do not reflect capabilities supported by the H.323 endpoint. A CRCX message example is as follows:

CRCX:

R: HD

L: Default media capabilities

M: Inactive (or receive only)

In the CRCX message example, the hd value in the R field instructs gateway 1202 to go off-hook. The value in the L field specifies local connection options, which indicate to gateway 1202 the media capabilities of H.323 endpoint 1200. In response to the CRCX message, in line 4 of the call flow diagram, MGCP gateway 1202 transmits an OK message to MGCP agent 1206. The OK message includes an SDP portion with the media description for the connection. An exemplary media description is as follows:

v=0 c=IP address m=media description

In the exemplary media description set forth above, the IP address in the c=parameter is the IP address on MGCP gateway 1202 for receiving the media stream. The media description specified in the m=parameter includes the type of media that the media gateway is capable of receiving, e.g., voice, data, or video.

In line 5 of the call flow diagram, MGCP agent 1206 transmits an AIP call progress (CPG) message to H.323 agent 1204. The AIP CPG message includes the connection information parameter data structure in which the media description from the SDP portion of the AIP message is mapped into AIP format. The media description is stored by H.323 agent 1204, but is not transmitted to H.323 endpoint 1200 as a fast start parameter.

In line 6 of the call flow diagram, H.323 agent 1204 transmits an ALERTING message to H.323 endpoint 1200. The ALERTING message notifies H.323 endpoint 1200 that the MGCP end user is being alerted. When the MGCP end user answers the call, in line 7 of the call flow diagram, MGCP gateway 1202 transmits a NOTIFY message to MGCP agent 1206. In line 8 of the call flow diagram, MGCP agent 1206 transmits an AIP answer message (ANM) to H.323 agent 1204. In line 9 of the call flow diagram, H.323 agent 1204 transmits a CONNECT message to H.323 endpoint 1200. In lines 10 and 11 of the call flow diagram, the H.245 master/slave determination takes place. H.323 agent 1204 handles the exchange and does not map the exchange to the agent interworking protocol.

In lines 12 and 13 of the call flow diagram H.323 endpoint 1200 and H.323 agent 1204 exchange H.245 TCS and H.245 TCS ACK messages. This exchange communicates the media capabilities of H.323 endpoint 1200 to H.323 agent 1204. In line 14 of the call flow diagram, H.323 agent 1204 transmits a multipart message to MGCP agent 1206. H.323 agent 1204 maps the capabilities of H.323 endpoint 1200 into AIP format and includes these capabilities in an AIP CPG message. Optionally, the H.245 representation of the TCS can be sent as well. In this example, a multipart message is sent that includes both the AIP CPG message and the H.245 TCS message. Since MGCP agent 1206 can not support H.245 TCS, MGCP agent 1206 can only process the AIP portion of the multipart message.

In lines 15 and 16 of the call flow diagram, H.323 endpoint 1200 and H.323 agent 1204 exchange TCS and TCS ACK messages. In this exchange, the capabilities of MGCP gateway 1202, which were received and stored upon receipt of the AIP CPG message in line 5 of the call flow diagram, are sent to H.323 endpoint 1200 as an H.245 terminal capability set. In lines 17-20 of the call flow diagram, H.323 endpoint 1200 and H.323 agent 1204 exchange H.245 OPEN LOGICAL CHANNEL and H.245 OPEN LOGICAL CHANNEL ACKNOWLEDGE messages. In this exchange, H.323 agent 1204 two unidirectional media streams between the end users. H.323 endpoint 1200 returns its RTP port for each media stream in the acknowledge messages.

In line 21 of the call flow diagram, H.323 agent 1204 transmits an AIP CPG message to MGCP agent 1206. CPG message contains an updated media description to reflect the RTP address of H.323 endpoint 1200 and the mode change to send receive. In line 22 of the call flow diagram, MGCP agent 1206 transmits a modify connection message to MGCP gateway 1202. This updates the media description at MGCP gateway 1202 and a full duplex media path between end users is complete.

H.323—NAQ.931 Call Hold Scenario

Figure 14:
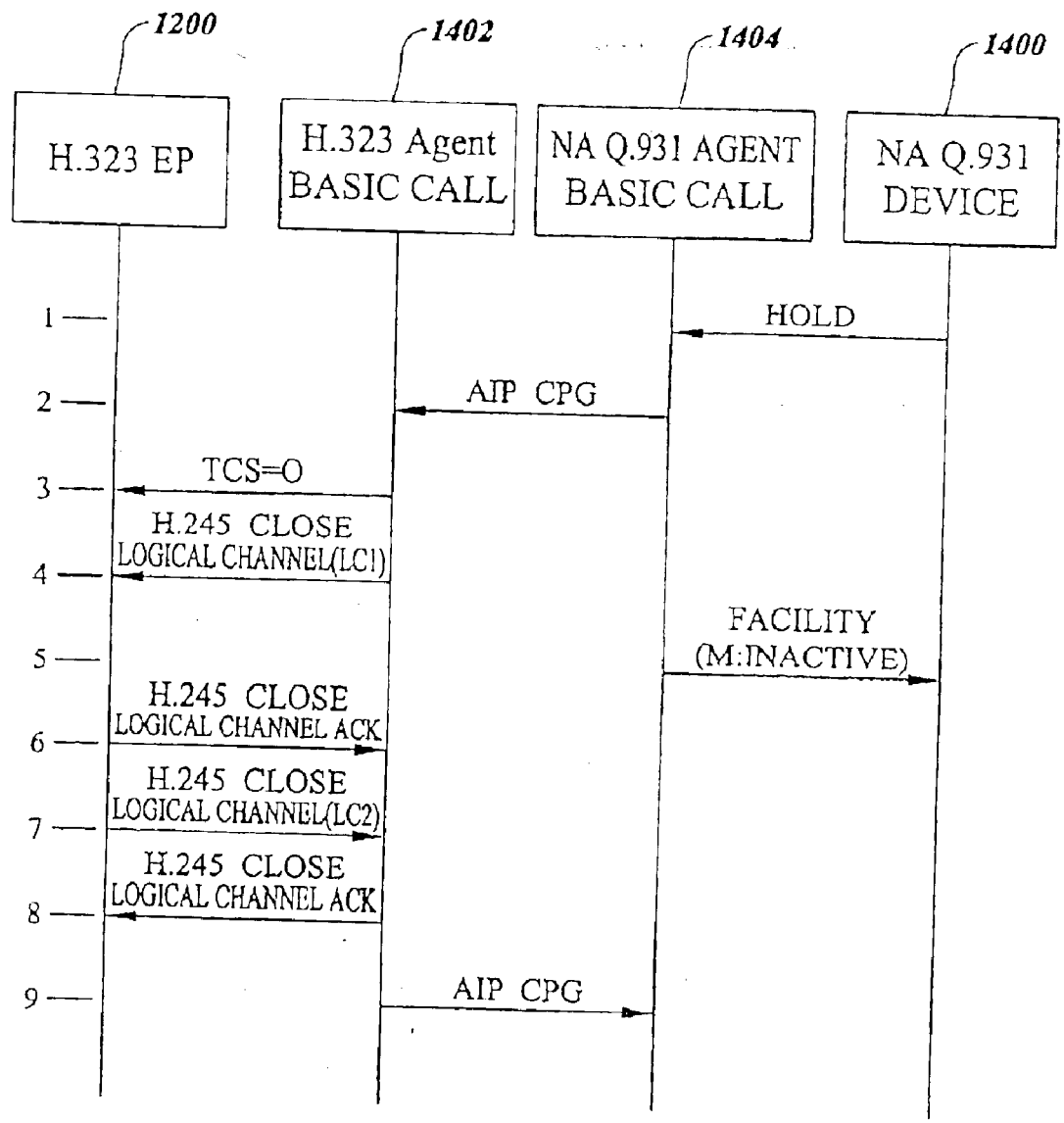
FIG. 14 is a call flow diagram illustrating exemplary call signaling for a hold scenario between H.323 and North American Q.931 endpoints according to an embodiment of the present invention.

FIG. 14 illustrates interworking between an H.323 endpoint and an NAQ.931 device for a call hold scenario. In FIG. 14, it is assumed that a bi-directional media stream has been established between H.323 endpoint 1200 and NAQ.931 device 1400. H.323 endpoint 1200 can be an IP terminal, as previously described with respect to FIG. 12. NAQ.931 device 1400 can comprise an IP terminal. H.323 agent 1402 includes interworking agent capabilities as well as H.323 gatekeeper capabilities. Similarly, NAQ.931 agent 1404 includes interworking agent capabilities as well as NAQ.931 agent capabilities.

In line 1 of the call flow diagram, NAQ.931 device 1400 transmits a HOLD message to NAQ.931 agent 1404. In line 2 of the call flow diagram, in response to the HOLD message, NAQ.931 agent 1404 transmits an AIP CPG message to H.323 agent 1402. The CPG message includes the connection information parameter data structure. The channel operation field in the data structure is set to mode change, and the mode field in the data structure is set to inactive. In line 3 of the call flow diagram, H.323 agent 1402 transmits a TCS=0 message to H.323 endpoint 1200. In line 4 of the call flow diagram, H.323 agent 1402 transmits a CLOSE LOGICAL CHANNEL message to H.323 endpoint 1200. The CLOSE LOGICAL CHANNEL message doses one of the two channels between H.323 endpoint 1200 and NAQ.931 device 1400. In line 5 of the call flow diagram, NAQ.931 agent 1404 transmits a FACILITY message to NAQ.931 device 1400. The FACILITY message indicates that inactive mode has been entered. In line 6 of the call flow diagram, H.323 endpoint 1200 transmits a CLOSE LOGICAL CHANNEL ACKNOWLEDGE message to H.323 agent 1402 acknowledging the closing of logical channel 1.

In lines 7 and 8 of the call flow diagram, H.323 endpoint 1200 and H.323 agent 1402 exchange H.245 CLOSE LOGICAL CHANNEL and CLOSE LOGICAL CHANNEL ACKNOWLEDGE messages for logical channel 2. Once logical channel 2 is closed, in line 9 of the call flow diagram H.323 agent 1402 transmits an AIP CPG message to NAQ.931 agent 1404. The AIP CPG message includes the connection information parameter. The change operation field in the connection information parameter data structure is set to mode change, and the mode is set to inactive.

H.323—NAQ.931 Call Retrieve Scenario

Figure 15:
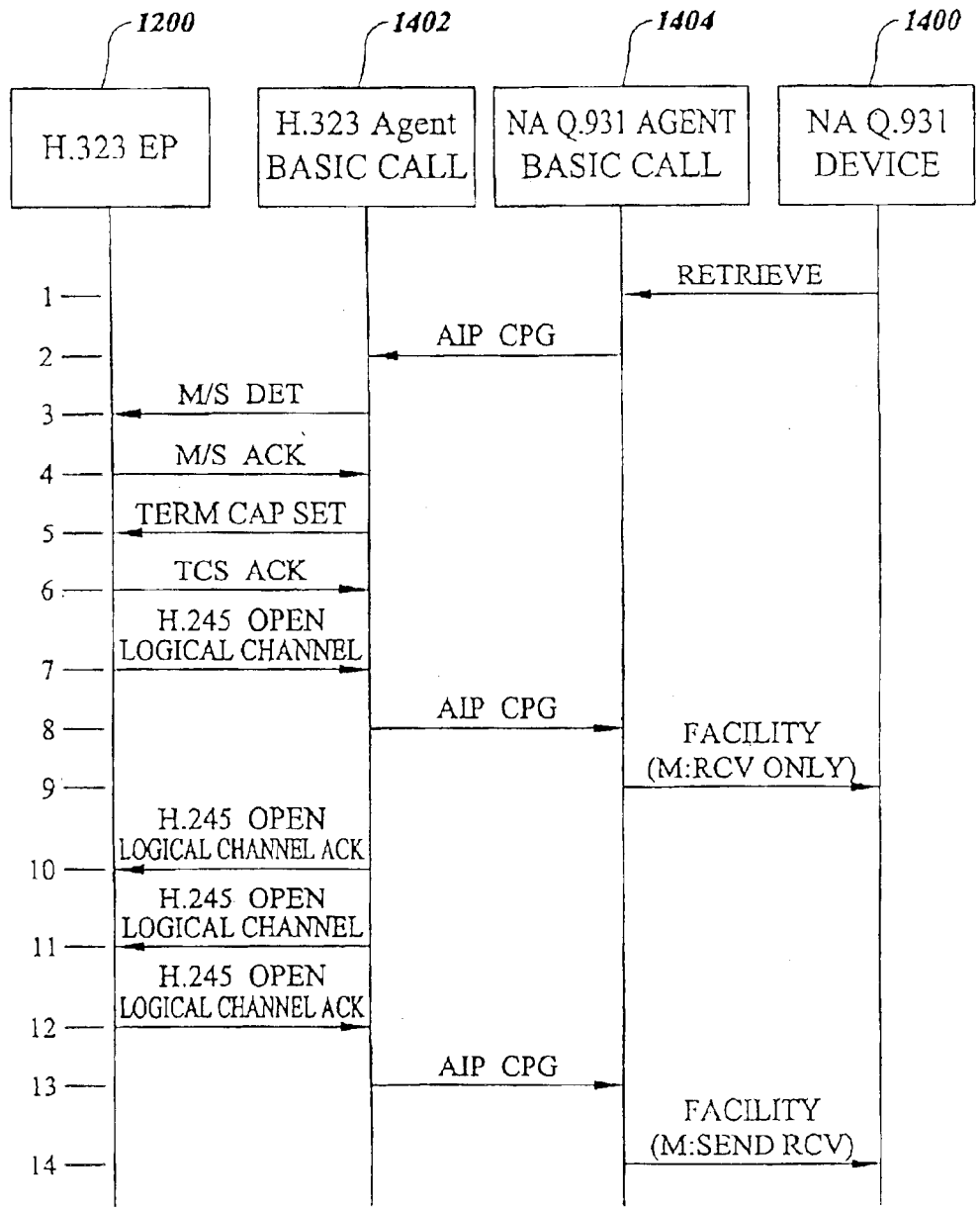
FIG. 15 is a call flow diagram illustrating exemplary call signaling for a retrieve scenario between H.323 and North American Q.931 endpoints according to an embodiment of the present invention.

FIG. 15 illustrates H.323 to NAQ.931 interworking for a call retrieve scenario. The entities illustrated in FIG. 15 are the same as those illustrated in FIG. 14. Hence, a description thereof is not repeated herein. In FIG. 15, it is assumed that a call between H.323 endpoint 1200 and NAQ.931 device 1400 has been put on hold. Thus, the signaling that must occur between H.323 endpoint 1200 and NAQ.931 device 1400 to retrieve the call includes reopening the logical channels between H.323 endpoint 1200 and NAQ.931 device 1400.

In line 1 of the call flow diagram illustrated in FIG. 15, NAQ.931 device 1400 transmits a RETRIEVE message to NAQ.931 agent 1404. In line 2 of the call flow diagram, NAQ.931 agent 1404 transmits an AIP CPG message to H.323 agent 1402. The CPG message includes the connection information parameter data structure with the change operation field set to mode change and the mode set to send/receive. In lines 3 and 4 of the call flow diagram, the H.245 master/slave determination occurs between H.323 endpoint 1200 and H.323 agent 1402. H.323 endpoint 1200 and H.323 agent 1402 must revert to a TCS exchange in order to reestablish the media streams. Accordingly, in lines 5 and 6 of the call flow diagram H.323 endpoint 1200 and H.323 agent 1402 exchange TCS and TCS ACK messages.

In line 7 of the call flow diagram H.323 endpoint 1200 transmits an H.245 OPEN LOGICAL CHANNEL to H.323 agent 1402. In line 8 of the call flow diagram, H.323 agent 1402 transmits an AIP CPG message to NAQ.931 agent 1404. The CPG message includes the connection information parameter data structure. The channel operation field and the data structure is set to mode change and the mode is set to send only. This reestablishes one of the media streams between H.323 endpoint 1200 and NAQ.931 device 1400. In line 9 of the call flow diagram, NAQ.931 agent 1404 transmits a FACILITY message to NAQ.931 device 1400. The FACILITY message includes a mode parameter that sets the channel to be receive only.

In line 10 of the call flow diagram H.323 agent 1402 transmits an OPEN LOGICAL CHANNEL ACKNOWLEDGE message to H.323 endpoint 1200 acknowledging the opening of logical channel 1. In line 11 of the call flow diagram, H.323 agent 1402 transmits an H.245 OPEN LOGICAL CHANNEL message to H.323 endpoint 1200 to open logical channel 2. In line 12 of the call flow diagram, H.323 endpoint 1200 transmits an H.245 OPEN LOGICAL CHANNEL ACKNOWLEDGE message to H.323 agent 1402. In line 13 of the call flow diagram, H.323 agent 1402 transmits an AIP CPC message to NAQ.931 agent 1404. The CPG message includes the connection information parameter data structure. The channel operation field in the data structure is set to mode change and the mode field is set to send/receive. In line 14 of the call flow diagram, NAQ.931 agent 1404 transmits a FACILITY message to NAQ.931 device 1400. The FACILITY message includes a mode field that sets the mode to be send/receive. Once this message is received, both logical channels are open between H.323 endpoint 1200 and NAQ.931 device 1400.

H.323—MGCP Hold Scenario

Figure 16:
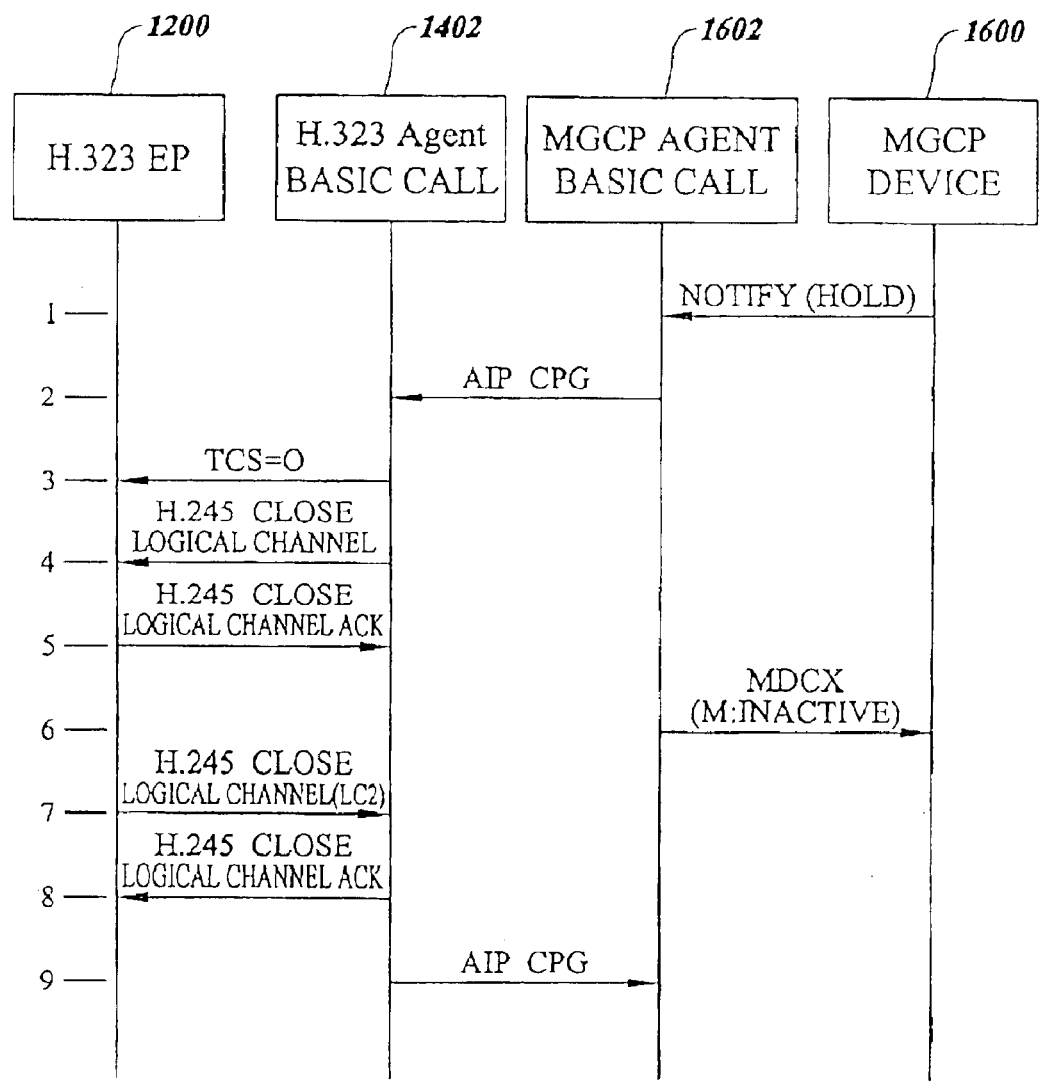
FIG. 16 is a call flow diagram illustrating exemplary call signaling for a hold scenario between H.323 and MGCP endpoints according to an embodiment of the present invention.

FIG. 16 illustrates interworking for an H.323—MGCP hold scenario. In FIG. 16, it is assumed that a call has been established between H.323 endpoint 1200 and MGCP device 1600. MGCP device 1600 is assumed to support an event package for call hold and retrieve events. H.323 device 1200 is the same as H.323 device 1200 described with respect to FIG. 12, and hence a description thereof is not repeated herein. MGCP device 1600 can be an MGCP device, such as a media gateway. MGCP agent 1602 includes interworking agent functionality as well as MGCP media gateway controller functionality. H.323 agent 1402 is the same as H.323 agent 1402 described with respect to FIG. 14, and hence a description thereof is not repeated herein.

In line 1 of the call flow diagram, MGCP device 1600 transmits a NOTIFY message to MGCP agent 1602. The NOTIFY message includes an event that informs MGCP agent 1602 that the end user connected to MGCP device 1600 has placed the call on hold. In line 2 of the call flow diagram, MGCP agent 1602 transmits an AIP CPG message to H.323 agent 1402. The AIP CPG message includes the connection information parameter. The channel operation field in the connection information parameter data structure is set to mode change and the mode field is set to inactive. In line 3 of the call flow diagram, H.323 agent 1402 transmits a TCS=0 message to H.323 endpoint 1200.

In lines 4 and 5 of the call flow diagram, H.323 endpoint 1200 and H.323 agent 1402 exchange CLOSE LOGICAL CHANNEL messages to close the logical channel between H.323 endpoint 1200 and MGCP device 1600. In line 6 of the call flow diagram, MGCP agent 1602 transmits a MODIFY connection (MDCX) message to MGCP device 1600 indicating that the mode has been set to inactive. In lines 7 and 8 of the call flow diagram, H.323 endpoint 1200 and H.323 agent 1402 exchange the messaging required to close logical channel 2. H.323 agent 1402 interprets the inactive mode as a hold and applies H.323 third party calls and rerouting procedures to implement the hold actions. These procedures result in the closing of both unidirectional media streams between H.323 endpoint 1200 and MGCP device 1600. In line 9 of the call flow diagram, H.323 agent 1402 transmits an AIP CPG message to MGCP agent 1602. The CPG message includes the connection information parameter data structure. The channel operation field in the connection information data structure is set to mode change, and the mode field is set to inactive.

H.323—MGCP Retrieve Scenario

Figure 17:
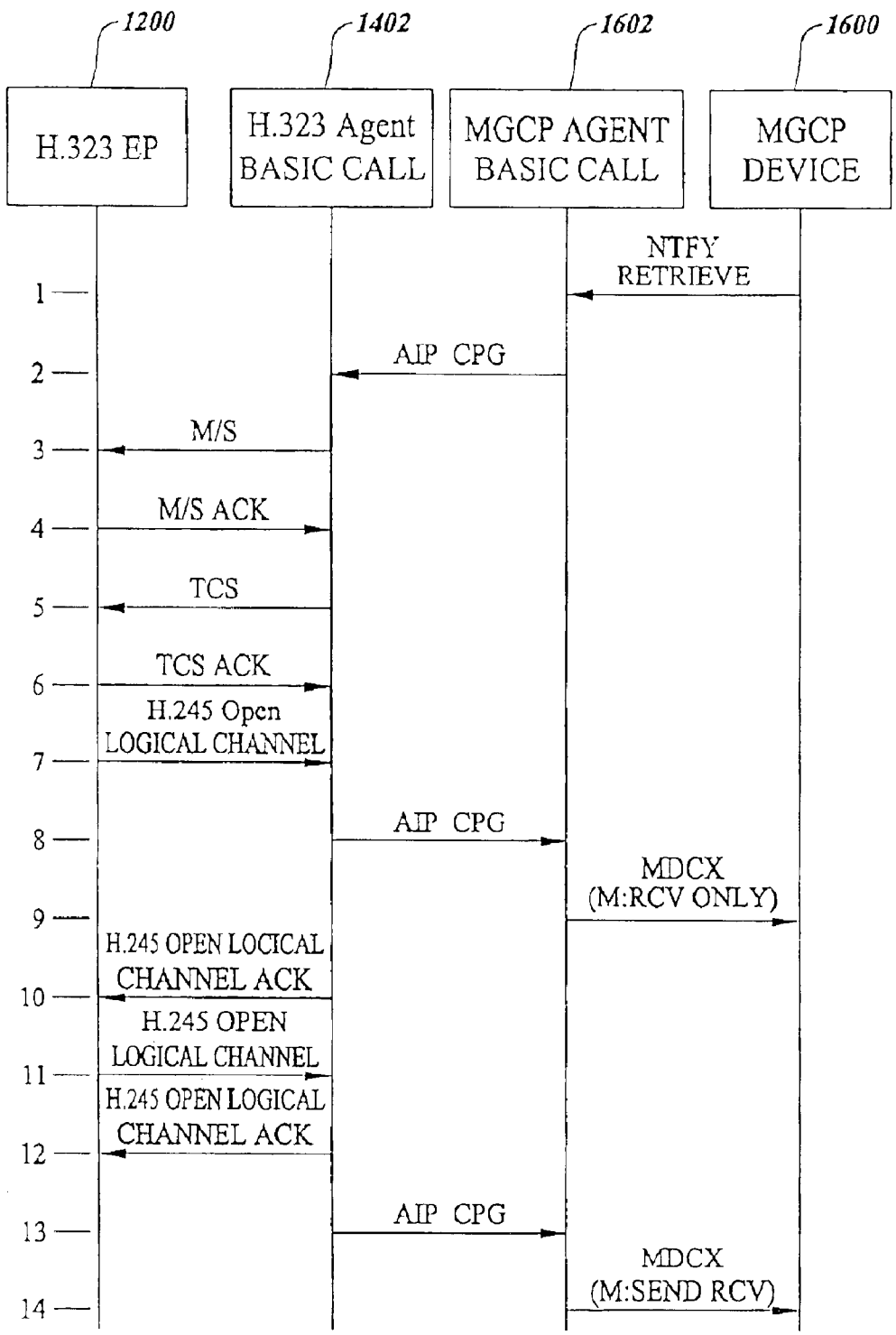
FIG. 17 is a call flow diagram illustrating exemplary call signaling for a retrieve scenario between H.323 and MGCP endpoints according to an embodiment of the present invention.

FIG. 17 illustrates an H.323—MGCP retrieve scenario. The entities illustrated in FIG. 17 are the same as those illustrated in FIG. 16, and hence a description thereof is not repeated herein. In FIG. 17, it is assumed that a call between H.323 endpoint 1200 and MGCP device 1600 has been placed on hold.

In line 1 of the call flow diagram, MGCP device 1600 transmits a NOTIFY message to MGCP agent 1602. The NOTIFY message contains an event that indicates to MGCP agent 1602 that the end user connected to MGCP device 1600 wishes to retrieve the call. In line 2 of the call flow diagram, MGCP agent 1602 transmits an AIP CPG message to H.323 agent 1402. The AIP CPG message includes the connection information parameter data structure. The channel operation field in the data structure is set to mode change, and the mode field is set to send/receive.

In lines 3 and 4 of the call flow diagram, H.323 agent 1402 and H.323 endpoint 1200 make a master/slave determination. The H.323 devices must revert to a TCS exchange in order to reestablish the media streams. Accordingly, in lines 5 and 6 of the call flow diagram, H.323 agent 1402 and H.323 endpoint 1200 exchange terminal capabilities.

In line 7 of the call flow diagram, H.323 endpoint 1200 transmits an H.245 open logical channel message to H.323 agent 1402 to open one of the logical channels between H.323 endpoint 1200 and MGCP device 1600. In line 8 of the call flow diagram, H.323 agent 1402 transmits an AIP CPG message to MGCP agent 1602. The AIP CPG message includes the connection information parameter data structure. The change operation field in the data structure is set to mode change, and the mode field is set to send only. In line 9 of the call flow diagram, MGCP agent 1602 transmits a modify connection message to MGCP device 1600. The modify connection message includes a mode field setting the mode to receive only. In line 10 of the call flow diagram H.323 agent 1402 acknowledges the H.245 open logical channel messages transmitted in line 7 of the call flow diagram.

In lines 11 and 12 of the call flow diagram, H.323 endpoint 1200 and H.323 agent 1402 exchange messaging for opening the other logical channel between H.323 endpoint and MGCP device 1600. In line 13 of the call flow diagram, H.323 agent 1402 transmits an AIP CPG message to MGCP agent 1602. The CPG message includes the connection information parameter data structure. The channel operation field in the data structure is set to mode change, and the mode field is set to send/receive. In line 14 of the call flow diagram, MGCP agent 1602 transmits a modify connection message to MGCP device 1600. The modify connection message instructs the device to change the mode to send/receive. At this point, both media streams between H.323 endpoint 1200 and MGCP device 1600 are established.

H.323 to MGCP Primary Rate Interface (PRI)

Common Channel Signaling (CCS)

Figure 18:
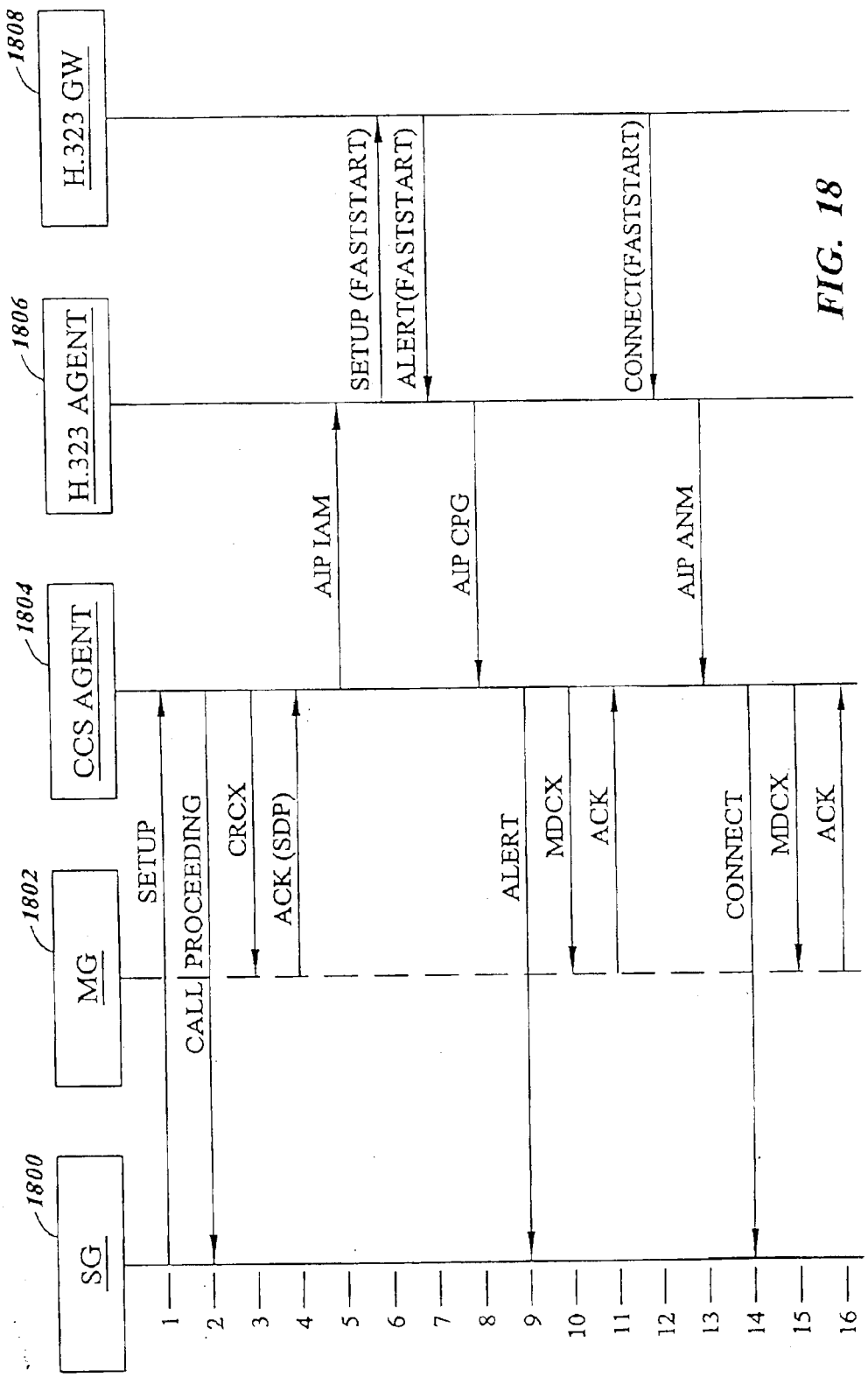
FIG. 18 is a call flow diagram illustrating exemplary call signaling between H.323 and MGCP endpoints for common channel signaling according to an embodiment of the present invention.

FIG. 18 illustrates exemplary call signaling for H.323 to MGCP PRI (CCS). In FIG. 18, signaling gateway 1800 relays call control signaling between a circuit-switched network and a packet-switched network. For example, signaling gateway 1800 may be connected to a PSTN end office on one side and to an IP network on the other side. In the illustrated embodiment, signaling gateway 1800 is configured to forward Q.931 call signaling messages from the PSTN network to a packet network and vice-versa. On the circuit-switched side, SG 1800 can be configured to send and receive Q.931 over Q.921 call signaling messages. On the packet-switched side, signaling gateway 1800 can be configured to send and receive Q.931 over ISDN User Adaptation over TCP/IP messages.

Media gateway 1802 converts between packets and circuits to communicate the media stream to and from a PSTN end user device. On the circuit-switched side, media gateway 1802 can send and receive the media stream using pulse code modulation (PCM) voice. On the packet-switched side, media gateway 1802 can send and receive the media stream using RTP over UDP/IP. In the illustrated embodiment, media gateway 1802 is controlled using MGCP.

CCS agent 1804 exchanges call control information with signaling gateway 1800 and media control information with media gateway 1802. In the illustrated embodiment, CCS 1804 communicates with signaling gateway 1800 using Q.931 call signaling over IUA over TCP/IP and with media gateway 1802 using MGCP. CCS agent 1804 also communicates with H.323 agent 1806 using the agent interworking protocol, as described above. It is understood that CCS agent 1804 and H.323 agent 1806 can be part of a call server. H.323 agent 1806 and H.323 gateway 1808 exchange call signaling information according to ITU Recommendation H.225.

In line 1 of the call flow diagram, signaling gateway 1800 transmits a SETUP message to CCS agent 1804. The SETUP message includes information, such as the dialed digits for creating a call with the called party. In line 2 of the call flow diagram CCS agent 1804 transmits a CALL PROCEEDING message to signaling gateway 1800 to indicate that CCS agent 1804 is attempting to establish a call with the called party. In line 3 of the call flow diagram, CCS agent 1804 sends an MGCP CREATE CONNECTION message to media gateway 1802. In response to the CREATE CONNECTION message, media gateway 1802 transmits an ACKNOWLEDGE message including an SDP portion that specifies the supported media capabilities of media gateway 1802. In line 5 of the call flow diagram, CCS agent 1804 transmits an AIP IAM message to H.323 agent 1806. The AIP IAM message includes the connection information parameter that specifies the supported media capabilities of media gateway 1802. In line 6 of the call flow diagram, H.323 agent 1806 transmits a SETUP message specifying the media capabilities of media gateway 1802 to H.323 to H.323 gateway 1808. In line 7 of the call flow diagram, H.323 gateway agent 1808 transmits an ALERT message to H.323 agent 1806 indicating that the called part is being alerted, of the incoming call. The ALERT message includes the supported media capabilities of H.323 gateway 1808. In line 8 of the call flow diagram, H.323 agent 1806 sends an AIP CALL PROGRESS message including the connection information parameter specifying the media description of H.323 gateway 1808. In line 9 of the call flow diagram, CCS agent 1804 transmits an ALERT message to signaling gateway 1800 indicating that the called party is being alerted.

In line 10 of the call flow diagram, CCS agent 1804 transmits an MGCP MODIFY CONNECTION message specifying the mode of the connection as receive only and including the media description of H.323 gateway 1808. In line 11 of the call flow diagram, media gateway 1802 acknowledges the MODIFY CONNECTION message.

In line 12 of the call flow diagram, when the called party answers the call, H.323 gateway 1808 transmits a CONNECT message to H.323 agent 1806. In line 13 of the call flow diagram, in response to receiving the CONNECT message, H.323 agent 1806 transmits an AIP ANSWER message to CCS agent 1804. In line 14 of the call flow diagram, CCS agent 1804 transmits a CONNECT message to signaling gateway 1800 indicating that the call has been answered. In line 15 of the call flow diagram, CCS agent 1804 transmits a MODIFY CONNECTION message to media gateway 1802 opening the connection as send/receive. In line 16 of the call flow diagram, media gateway 1802 acknowledges the MODIFY CONNECTION message. At this point, a bi-directional media stream communication is established between the called and calling parties. Thus, the call flow diagram illustrated in FIG. 18 embodies the true MGCP reference architecture whereby the SG and MG are separate entities.

MGCP—H.323 Call Setup and Exchange of DTMF Digits

Figure 19:
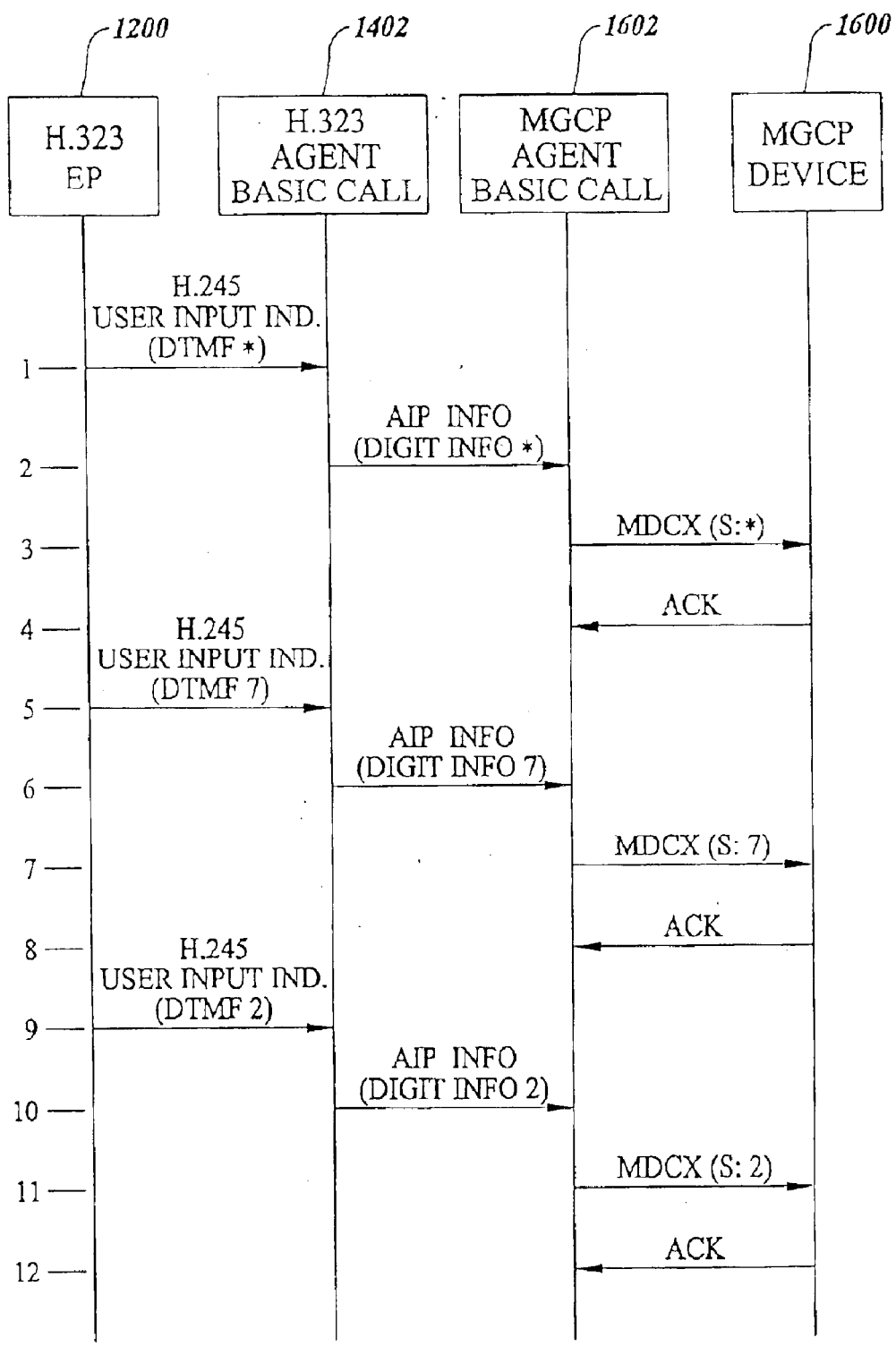
FIG. 19 is a call flow diagram illustrating exemplary call signaling between an MGCP gateway and an H.323 gateway according to an embodiment of the present invention.

FIG. 19 illustrates call signaling and exchange of DTMF digits between an MGCP gateway and an H.323 gateway. The entities illustrated in FIG. 19 are the same as those illustrated in FIG. 16. Hence, a description thereof is not repeated herein.

In FIG. 19 it is assumed that a connection has already been established between H.323 endpoint 1200 and MGCP device 1600. Therefore, call setup and teardown messages are not shown.

In line 1 of the call flow diagram, H.323 endpoint 1200 transmits a user input indication message to H.323 agent 1402 that includes the DTMF digit * encoded in the message. In line 2 of the call flow diagram, H.323 agent 1906 transmits an AIP_INFO message to MGCP agent 1602 that indicates that information is being communicated to MGCP agent 1602. The AIP_INFO message includes the digit information parameter that specifies the DTMF digit entered by the end user connected to H.323 gateway 1902. In line 3 of the call flow diagram, MGCP agent 1602 transmits a MODIFY CONNECTION message to MGCP device 1600. The modify connection message includes a signal indicating the DTMF digit *. In line 4 of the call flow diagram, MGCP device 1600 acknowledges the modify connection message. The remaining messages in FIG. 19 are similar to the messages described with respect to lines 1–4 of the call flow diagram. Hence, a description thereof is not repeated herein.

It will be understood that various details of the invention can be changed without departing from the scope of the invention. Furthermore, the foregoing description is for the purpose of illustration only, and not for the purpose of limitation—the invention being defined by the claims.

What is claimed is:

1. A call server comprising:
   (a) a fist protocol agent for communicating with a first internet protocol (IP) telephony device according to a first IP telephony protocol;
   (b) a second protocol agent for communicating with a second IP telephony device according to a second IP telephony protocol; and
   (c) an interworking agent for providing functions usable by the first and second protocol agents to communicate with each other according to a third protocol, the functions provided by the third protocol being a superset of functions provided by the first and second IP telephony protocols, said interworking agent further adapted to determine that a first parameter associated with the first IP telephony protocol does not map to the second IP telephony protocol and communicating first parameter to the second protocol agent without alteration.

2. The call server of claim 1 wherein the interworking agent comprises a first interworking agent component associated with the first protocol agent and a second interworking agent component associated with the second protocol agent.

3. The call server of claim 1 wherein the first protocol agent is a media gateway control protocol (MGCP) agent, the first IP telephony protocol is MGCP, the second protocol agent is an International Telecommunications Union (ITU) Recommendation H.323 agent, and the second IP telephony protocol is H.323.

4. The call server of claim 1 wherein the first protocol agent is an International Telecommunications Union Recommendation H.323 agent, the first IP telephony protocol is 11323, the second protocol agent is a session initiation protocol (SIP) agent, and the second IP telephony is SIP.

5. The call server of claim 1 wherein the first protocol agent is an International Telecommunications Union Recommendation H.323 agent, the first IP telephony protocol is H.323, the second protocol agent is a Bellcore Q.931 agent, and the second IP telephony protocol is an extension of Bellcore Q.931.

6. The call server of claim 1 wherein the first protocol agent is a media gateway control protocol (MGCP) agent, the first IP telephony protocol is MGCP, the second protocol agent is a media gateway control protocol (MGCP) agent, and the second IP telephony protocol is MGCP.

7. The call server of claim 1 wherein the first protocol agent is an International Telecommunications Union Recommendation H.323 agent, the first IP telephony protocol is H.323, the second protocol agent is an H.323 agent, and the second IP telephony protocol is H.323.

8. The call server of claim 1 wherein the first protocol agent performs originating call half functions and the second protocol agent performs terminating call half functions.

9. The call server of claim 1 wherein the interworking agent is adapted to provide a connection information parameter data structure usable by the first and second protocol agents, for communicating media capabilities and media stream management information between the first and second protocol agents.

10. The call server of claim 1 wherein the interworking agent is adapted to provide a digit information parameter usable by the first and second protocol agents for communicating dual tone multifrequency (DTMF) digits between the first and second protocol agents.

11. A method for interworking devices that communicate using different internet protocol (IP) telephony protocols, the method comprising:
   (a) receiving, from a first telephony device, a first message formatted according to a first IP telephony protocol;
   (b) in response to receiving the first message, generating a second message, formatted according to a second protocol, said second protocol being distinct from said first protocol, the second message including at least one of a media capabilities description and media stream management information derived from the first message;
   (c) transmitting the second message to a second protocol agent; and
   (d) in response to receiving the second message, generating a third message formatted according to a third IP telephony protocol, the third message including at least one of the media capabilities description and media stream management information derived from the second message.

12. The method of claim 11 wherein receiving a first message includes receiving the first message formatted according to the media gateway control protocol (MGCP) and generating a third message includes generating the third message formatted according to ITU Recommendation H.323.

13. The method of claim 11 wherein receiving a first message includes receiving the first message formatted according to the session initiation protocol (SIP) and generating a third message includes generating the third message formatted according to ITU Recommendation H.323.

14. The method of claim 11 wherein receiving a first message includes receiving the first message formatted according to ITU Recommendation H.323 and generating a third message includes generating the third message formatted according to Bellcore Q.931.

15. The method of claim 11 wherein receiving a first message includes receiving the first message formatted according to ITU Recommendation H.323 and generating a third message comprises generating the third message formatted according to media gateway control protocol (MGCP).

16. The method of claim 15 wherein receiving the first message formulated to ITU Recommendation H.323 includes receiving the first message containing H.323 fast start parameters, wherein generating a second message include mapping the H.323 fast start parameters to a media capabilities description in the second message, and generating the third message includes mapping the media capabilities description to MGCP.

17. The method of claim 11 wherein receiving a first message includes receiving a HOLD message from the first telephony device, generating the second message includes generating a message including a connection information parameter having a mode change value for changing the mode of a media stream communication associated with the first telephony device, and wherein generating a third message includes generating a message for changing the mode of the media stream communication to inactive according to the third IP telephony protocol.

18. The method of claim 11 wherein receiving a first message includes receiving a RETRIEVE message from the first telephony device, and generating a second message includes generating a message including a connection information parameter having a mode change value of active.

19. The method of claim 11 wherein receiving a first message includes receiving a first message including at least one dual tone multifrequency (DTMF) digit value, generating a second message includes mapping the DTMF digit value to a digit information parameter value in the second protocol, and generating a third message includes mapping the digit information parameter value to a DTMF digit value formatted according to the third IP telephony protocol.

20. The method of claim 11 comprising transmitting the third message to a second telephony device configured to communicate according to the third IP telephony protocol.

21. A method for tunneling messages between protocol agents, the method comprising:

(a) receiving, from a first telephony device, a first message formatted according to a first IP telephony protocol;

(b) determining whether a parameter in the first message maps to a second IP telephony protocol;

(c) in response to determining that the parameter in the first message maps to the second IP telephony protocol, formulating a second message formatted according to the second IP telephony protocol; and (d) in response to determining that the parameter in the first message does not map to the second IP telephony protocol, transmitting the first message without alteration to a second protocol agent.

22. A method for tunneling messages between protocol agents, the method comprising:

receiving, from a first telephony device, a first message formatted according to a first 1P telephony protocol;

determining whether a parameter in the first message maps to a second 1P telephony protocol;

in response to determining that the parameter in the first message maps to the second IP telephony protocol, formulating a second message formatted according to the second IP telephony protocol;

in response to determining that the parameter in the first message does not map to the second IP telephony protocol, transmitting the first message without alteration to a second protocol agent, and in response to determining that the parameter in the first message partially maps to the second IP telephony protocol, formulating a multiprotocol message, the multiprotocol message including a message formatted according to the first IP telephony protocol and a third message formatted to the second IP telephony protocol.

23. The method of claim 22 comprising transmitting the multiprotocol message to a second protocol agent.

24. The method of claim 23 comprising in response to receiving the multiprotocol message, dividing the multiprotocol message into the second and third messages.

25. The method of claim 24 comprising after dividing the multiprotocol message, determining whether processing of the second message is supported by the second IP telephony protocol agent, and in response to determining that the processing of the second message is supported, processing the second message.

26. The method of claim 25 comprising processing the third message.

27. A computer program product comprising computer-executable instructions embodied in a computer readable medium for performing steps comprising:

invoking a first protocol agent for communicating with a first internet protocol (IP) telephony device according to a first IP telephony protocol;

invoking a second protocol agent for communicating with a second IP telephony device according to a second IP telephony protocol;

mapping media capabilities information extracted from messages received from the first and second IP telephony devices formatted according to the first and second IP telephony protocols to a third protocol;

transmitting a first message containing the media capabilities information and formatted according to the third protocol between the first and second protocol agents;

determining whether a parameter from the first IP telephony protocol maps to the second IP telephony protocol; and in response to said determining that the parameter from the first IP telephony protocol does not map to the second IP telephony protocol, transmitting the parameter without alteration to the second protocol agent.

28. The computer program product of claim 27 wherein invoking a first protocol agent includes invoking a first protocol agent for performing originating call functions and invoking a second protocol agent includes invoking a second protocol agent for performing terminating call functions.

29. The computer program product of claim 27 comprising at the first protocol agent, mapping media stream information received from the second protocol agent to the first IP telephony protocol.

30. The computer program product of claim 27 comprising, at the second protocol agent, mapping media stream information received from the first protocol agent to the second IP telephony protocol.

31. The computer program product of claim 27 wherein the first IP telephony protocol is the media gateway control protocol and the second IP telephony protocol is ITU Recommendation H.323.

32. The computer program product of claim 27 wherein the first IP telephony protocol is ITU Recommendation H.323 and the second IP telephony protocol is Bellcore Q.931.

33. The computer program product of claim 27 wherein the first IP telephony protocol is the session initiation protocol and the second IP telephony protocol is ITU Recommendation H.323.

34. A computer readable medium having software stored thereon, said software comprising;
- a fist protocol agent for communicating with a first internet protocol (IP) telephony device according to a first IP telephony protocol;
- a second protocol agent for communicating with a second internet protocol telephony device according to a second IP telephony protocol, wherein said second IP telephony protocol is distinct from said first IP telephony protocol;
- a third protocol agent for communicating with a third internet protocol telephony device according to a third IP telephony protocol, wherein said third IP telephony protocol is distinct from said first and second IP telephony protocols; and
- an interworking protocol adapted to represent a partial superset of messaging capabilities of said first, second, and third IP telephony protocols such that messages received in any of said first, second, or third IP telephony protocols from a first IP device are converted to said interworking protocol and then translated into a different one of said first, second, or third IP telephony protocols for transmission to a second IP device.

* * * * *

UNITED STATES PATENT AND TRADEMARK OFFICE
CERTIFICATE OF CORRECTION

PATENT NO. : 6,885,658 B1
APPLICATION NO. : 09/506945
DATED : April 26, 2005
INVENTOR(S) : Ress et al.

Page 1 of 1

It is certified that error appears in the above-identified patent and that said Letters Patent is hereby corrected as shown below:

In the Claims

Column 19, line 51
replace "a fist protocol agent"
with --a first protocol agent--

Column 20, lines 14-15
replace "IP telephony protocol is 11323,"
with --IP telephony protocol is H.323,--

Column 22, line 12
replace "first 1P"
with --first IP--

Column 22, line 14
replace "second 1P"
with --second IP--

Column 24, line 3
replace "a fist protocol agent"
with --a first protocol agent--

Signed and Sealed this
Ninth Day of December, 2014

Michelle K. Lee
*Deputy Director of the United States Patent and Trademark Office*